United States Patent
Minamiyama

(10) Patent No.: US 9,383,948 B2
(45) Date of Patent: Jul. 5, 2016

(54) PRINTING SYSTEM, PRINTING APPARATUS, AND PRINTING PROGRAM

(75) Inventor: Yukinori Minamiyama, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 5 days.

(21) Appl. No.: 13/338,154

(22) Filed: Dec. 27, 2011

(65) Prior Publication Data

US 2012/0162713 A1     Jun. 28, 2012

(30) Foreign Application Priority Data

Dec. 27, 2010   (JP) ................................. 2010-289447

(51) Int. Cl.
*G06F 3/12*     (2006.01)

(52) U.S. Cl.
CPC ............ *G06F 3/1205* (2013.01); *G06F 3/1208* (2013.01); *G06F 3/1257* (2013.01); *G06F 3/1271* (2013.01); *G06F 3/1285* (2013.01); *G06F 3/122* (2013.01); *G06F 3/1204* (2013.01); *G06F 3/1255* (2013.01); *G06F 3/1265* (2013.01)

(58) Field of Classification Search
CPC ... G06F 3/1204; G06F 3/1205; G06F 3/1208; G06F 3/122; G06F 3/1255; G06F 3/1257; G06F 3/1265; G06F 3/1271; G06F 3/1285
USPC .............................................. 358/150; 705/8
See application file for complete search history.

(56) References Cited

U.S. PATENT DOCUMENTS 6,348,972 B1 *  2/2002  Taniguchi et al. ........... 358/1.15
2004/0239984 A1   12/2004  Ishii et al.
(Continued)

FOREIGN PATENT DOCUMENTS

| JP | 2004-355116 A | 12/2004 |
|---|---|---|
| JP | 2004-355197 A | 12/2004 |

(Continued)

OTHER PUBLICATIONS

Japan Patent Office, Notification of Reason for Refusal for Japanese Patent Application No. 2010-289447 (counterpart to above-captioned patent application), mailed Feb. 12, 2014.
(Continued)

*Primary Examiner* — Tammy Pham
*Assistant Examiner* — Bharatkumar Shah
(74) *Attorney, Agent, or Firm* — Baker Botts L.L.P.

(57) ABSTRACT

A printing system includes: a printing apparatus printing an image acquired from a providing apparatus which provides a service for sharing the image; and a communication apparatus. The printing apparatus includes: a first acquiring unit configured to acquire service information; a first transmitting unit configured to transmit the service information; a first receiving unit configured to receive print setting information; a second transmitting unit configured to transmit a command to request the image; a second receiving unit configured to receive the image from the providing apparatus; and a first printing unit configured to print the image on the basis of the print setting information, and the communication apparatus includes: a third receiving unit configured to receive the service information; a second acquiring unit configured to acquire the print setting information corresponding to the service information; and a third transmitting unit configured to transmit the print setting information.

12 Claims, 23 Drawing Sheets

(56) References Cited

U.S. PATENT DOCUMENTS

| | | |
|---|---|---|
| 2007/0027857 A1 | 2/2007 | Deng et al. |
| 2007/0229885 A1 | 10/2007 | Kimura |
| 2009/0083304 A1 | 3/2009 | Dornbach et al. |
| 2009/0122343 A1 | 5/2009 | Nishitani |
| 2009/0225366 A1* | 9/2009 | Emori .................. G06F 3/1204 358/1.15 |
| 2009/0310164 A1* | 12/2009 | Takahashi et al. ........... 358/1.13 |
| 2010/0225966 A1* | 9/2010 | Bailey et al. ................. 358/1.15 |
| 2010/0312600 A1* | 12/2010 | Motoyama ............ G06F 3/1218 705/7.35 |
| 2010/0332677 A1* | 12/2010 | Tian ........................ H04L 67/16 709/233 |
| 2011/0013226 A1* | 1/2011 | Grosz ................ G06F 17/3028 358/1.15 |
| 2012/0081743 A1 | 4/2012 | Watanabe et al. |
| 2012/0084402 A1 | 4/2012 | Ito et al. |

FOREIGN PATENT DOCUMENTS

| | | |
|---|---|---|
| JP | 2005-269250 A | 9/2005 |
| JP | 2006-202028 A | 8/2006 |
| JP | 2006-260335 A | 9/2006 |
| JP | 2006252321 A | 9/2006 |
| JP | 2007164482 A | 6/2007 |
| JP | 2007-274209 A | 10/2007 |
| JP | 2009193567 A | 8/2009 |
| JP | 2010181932 A | 8/2010 |

OTHER PUBLICATIONS

European Patent Office, extended European Search Report for European Patent Application No. 11182979.2 (counterpart to above-captioned patent application), dated Mar. 8, 2012.

European Patent Office, extended European Search Report for European Patent Application No. 11182976.8 (counterpart to above-captioned patent application), dated Mar. 8, 2012.

Japan Patent Office; Notification of Reasons for Rejection issued for Japanese Patent Application No. 2014-163392 (foreign counterpart of above-captioned patent application), mailed Jul. 14, 2015.

* cited by examiner

FIG. 3

| ID | REGISTERED PASSWORD | ACCESS TOKEN |
|---|---|---|
| 001 | zxcvbnm | poiuytrewqasdfghjklmn |
| 002 | asdfghjk | mlk3opij7nbh9uygvcftr |
| 003 | qwertyui | 12jiuyh75jukacsftwquiq |
| 004 | okmnjiuh | i2jhsguio8opzxchf1qy7 |

| MODEL NAME | PRINT SETTING INFORMATION | | | | | | |
|---|---|---|---|---|---|---|---|
| | COLOR | A4 | B5 | BOTH SIDES | MINI CARD | LAYOUT 1 | HIGH QUALITY |
| MODEL 1 | M1C | M1A4 | M1B5 | M1R | M1MC | M1L1 | M1B |
| MODEL 2 | M2C | M2A4 | M2B5 | M2R | M2MC | M1L2 | M2B |
| MODEL 3 | M3C | M3A4 | M3B5 | M3R | M3MC | M1L3 | M3B |
| MODEL 4 | M4C | M4A4 | M4B5 | M4R | M4MC | M1L4 | M4B |

| ID | SERVICE INFORMATION | NAME | MODEL NAME | PRINT SETTING INFORMATION | NUMBER OF USES |
|---|---|---|---|---|---|
| 001 | SERVICE 1 | PRINT SETTING 1 | MODEL 1 | LAYOUT 1/FRAME BORDER/COLOR/5 SHEETS | 5 |
| 001 | SERVICE 2 | PRINT SETTING 2 | MODEL 2 | MINI CARD/COLOR/10 SHEETS | 10 |
| 001 | SERVICE 1 | PRINT SETTING 3 | MODEL 3 | COLOR/BOTH SIDES/1 SHEET/HIGH QUALITY/B5 | 15 |
| 001 | SERVICE 3 | PRINT SETTING 4 | MODEL 4 | LAYOUT 2/NO FRAME BORDER/MONOCHROME/2 SHEETS | 7 |

324

PRINTING SYSTEM, PRINTING APPARATUS, AND PRINTING PROGRAM

CROSS REFERENCE TO RELATED APPLICATION

The present application claims priority from Japanese Patent Application No. 2010-289447, which was filed on Dec. 27, 2010, the disclosure of which is herein incorporated by reference in its entirety.

TECHNICAL FIELD

The present invention relates to a printing system in which a printing apparatus acquires printing conditions from a communication apparatus and performs printing on the basis of the acquired printing conditions, a printing apparatus, and a printing program.

BACKGROUND

In recent years, an image storage service has become widespread which stores images in a database on a network provided by a service provider. An example of the image storage service is Picasa (registered trademark) Web album or flickr (registered trademark). The format of the images provided by the service varies depending on the service. Therefore, the optimal printing conditions when the provided images are printed vary depending on the service. When the above-mentioned printing apparatus is used to print a plurality of images provided by different services, it is difficult to acquire the printing conditions most suitable for each service from the server. Therefore, the user needs to change the printing conditions of the printing apparatus, in order to perform printing under the printing conditions most suitable for each service.

An object of the invention is to provide a printing system, a printing apparatus, and a printing program capable of performing printing under printing conditions most suitable for each service provided by an image storage service.

SUMMARY

According to an aspect of the present invention, there is provided a printing system comprising: a printing apparatus configured to print an image acquired from a providing apparatus which provides a service for sharing the image; and a communication apparatus communicable with the printing apparatus through a network, wherein the printing apparatus includes: a first acquiring unit configured to acquire service information indicating the type of service; a first transmitting unit configured to transmit the service information acquired by the first acquiring unit to the communication apparatus; a first receiving unit configured to receive print setting information, which is related to setting conditions for printing, from the communication apparatus after the first transmitting unit transmits the service information; a second transmitting unit configured to transmit a command to request the image to be printed to the providing apparatus; a second receiving unit configured to receive the image from the providing apparatus after the second transmitting unit transmits the command; and a first printing unit configured to print the image received by the second receiving unit on the basis of the print setting information received by the first receiving unit, and the communication apparatus includes: a third receiving unit configured to receive the service information transmitted from the printing apparatus; a second acquiring unit configured to acquire the print setting information corresponding to the service information received by the third receiving unit with reference to a storage unit that stores the service information and the print setting information so as to be associated with each other; and a third transmitting unit configured to transmit the print setting information acquired by the second acquiring unit to the printing apparatus.

According to an another aspect of the present invention, there is provided a printing apparatus comprising: a first acquiring unit configured to acquire service information indicating the type of service provided by a providing apparatus which provides a service for sharing an image; a first transmitting unit configured to transmit the service information acquired by the first acquiring unit to a communication apparatus that is connected through a network; a first receiving unit configured to receive print setting information related to setting conditions when printing is performed from the communication apparatus after the first transmitting unit transmits the service information; a second transmitting unit configured to transmit a command to request the image to be printed to the providing apparatus; a second receiving unit configured to receive the image from the providing apparatus after the second transmitting unit transmits the command; and a first printing unit configured to print the image received by the second receiving unit on the basis of the print setting information received by the first receiving unit.

According to another aspect of the present invention, there is provided a non-transitory computer readable medium storing a printing program for, when executed by a processor, causing a printing apparatus, which prints an image acquired from a providing apparatus which provides a service for sharing the image, to perform as a first acquiring unit, a first transmitting unit, a first receiving unit, a second transmitting unit, a second receiving unit, and a first printing unit, wherein: the first acquiring unit is configured to acquire service information indicating the type of service provided by the providing apparatus which provides the service for sharing the image; the first transmitting unit is configured to transmit the service information acquired in the first acquiring unit to a communication apparatus that is connected through a network; the first receiving unit is configured to receive print setting information, which is related to setting conditions for printing, the communication apparatus after the service information is transmitted in the first transmitting unit; the second transmitting unit is configured to transmit a command to request the image to be printed to the providing apparatus; the second receiving unit is configured to receive the image from the providing apparatus after the command is transmitted in the second transmitting unit; and the first printing unit is configured to print the image received in the second receiving unit on the basis of the print setting information received in the first receiving unit.

BRIEF DESCRIPTION OF THE DRAWINGS

Illustrative aspects of the invention will be described in detail with reference to the following figures wherein:

FIG. 3 is a diagram schematically illustrating a first table 321;

FIG. 5 is a diagram schematically illustrating a third table 323;

FIG. 24 is a diagram schematically illustrating a second table 324 according to a modification.

DETAILED DESCRIPTION OF EXEMPLARY EMBODIMENTS OF THE PRESENT INVENTION

Figure 1:
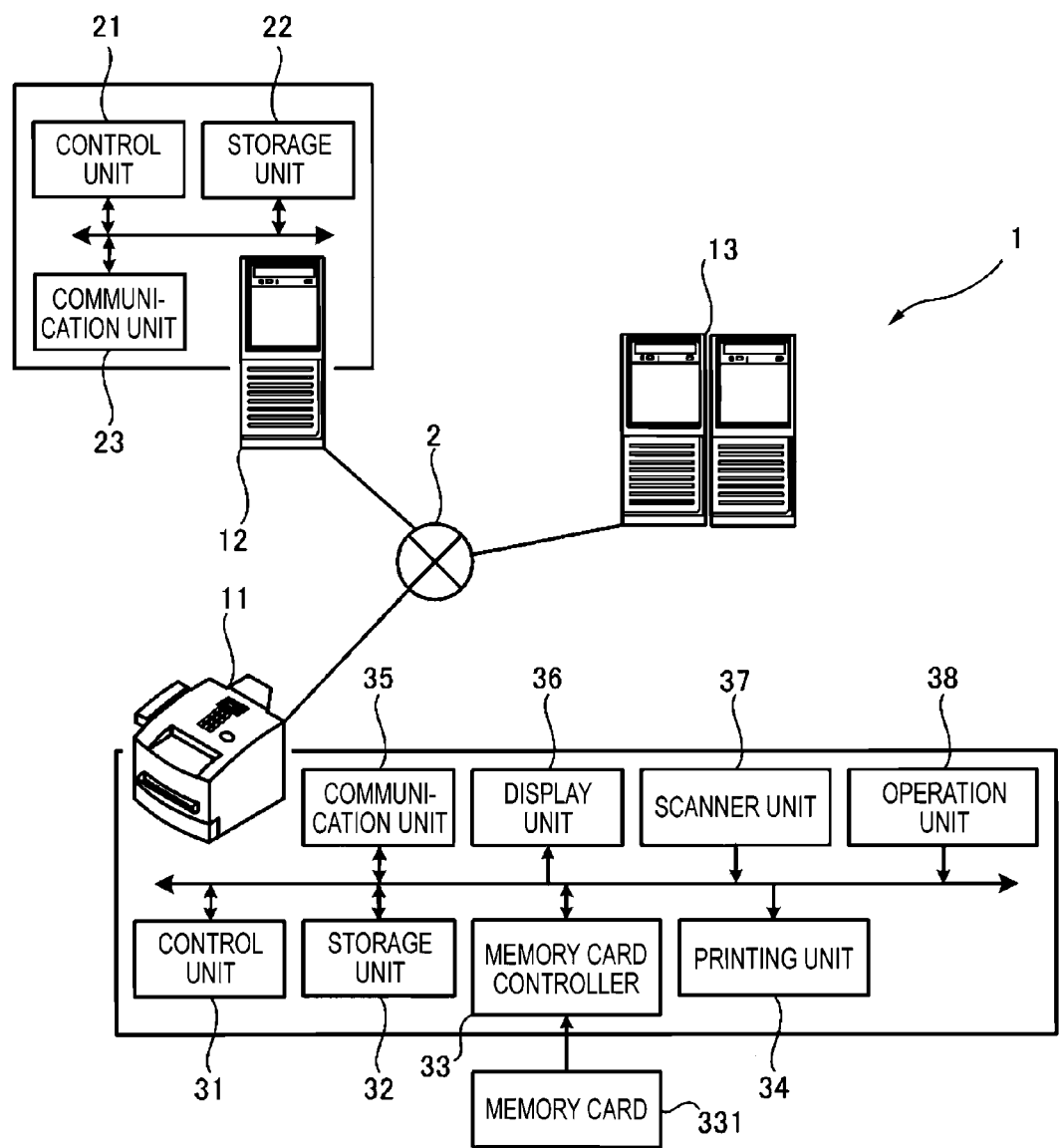
FIG. 1 is a diagram illustrating the outline of a printing system 1 and the electrical structure of a printing apparatus 11 and a communication apparatus 12.

Hereinafter, an embodiment of the invention will be described with reference to the accompanying drawings. The drawings are used to illustrate the technical characteristics of the invention. The structures of devices and the flowcharts of various kinds of processes described in the invention are not limited to those illustrated in the drawings, but are illustrative.

The outline of a printing system 1 will be described with reference to FIG. 1. The printing system 1 includes at least a printing apparatus 11 and a communication apparatus 12. The printing apparatus 11 is a kind of small digital multi-function machine. The printing apparatus 11 has at least a print function and a communication function. The communication apparatus 12 has a known server function. As the communication apparatus 12, a rental server or a virtual machine may be used. The printing apparatus 11 and the communication apparatus 12 are connected to a network 2. For example, an Internet network may be used as the network 2.

The printing apparatus 11 and the communication apparatus 12 can communicate with a providing apparatus 13 through the network 2. The providing apparatus 13 is a web server that provides an image storage service. The providing apparatus 13 is managed by each service provider. The user can use the services provided by the providing apparatus 13 to upload images to the providing apparatus 13 or download images from the providing apparatus 13. The providing apparatus 13 performs communication according to an HTTP or an HTTPS to provide a predetermined service.

The printing apparatus 11 can use the services provided by the providing apparatus 13 in cooperation with the communication apparatus 12. The printing apparatus 11 can use the services provided by the providing apparatus 13 to download images from the providing apparatus 13. The printing apparatus 11 can acquire, from the communication apparatus 12, setting conditions (hereinafter, referred to as "print setting information") when the images downloaded by the use of the services are printed. The printing apparatus 11 can print the image downloaded from the providing apparatus 13 on the basis of the print setting information acquired from the communication apparatus 12.

Next, the electrical structure of the printing apparatus 11 will be described. The printing apparatus 11 includes a control unit 31 that controls the printing apparatus 11. The control unit 31 is electrically connected to a storage unit 32, a memory card controller 33, a printing unit 34, a communication unit 35, a display unit 36, a scanner unit 37, and an operation unit 38. The control unit 31 includes a CPU, a ROM, and a RAM which are not shown. The CPU controls the operation of the printing apparatus 11 according to programs stored in the ROM. The RAM is a storage device that temporarily stores various kinds of data.

The storage unit 32 is a non-volatile storage device. The storage unit 32 stores at least a first table 321 (see FIG. 3) which will be described below. The memory card controller 33 can read information stored in a memory card 331 which is inserted into the printing apparatus 11 and write information to the memory card. The printing unit 34 prints the downloaded images in response to instructions from the control unit 31. The communication unit 35 is for communicating with other apparatuses connected to the network 2. The display unit 36 is a display device including a known display, such as an LCD. The display unit 36 displays predetermined information in response to instructions from the control unit 31. The scanner unit 37 reads images recorded on a medium which is set by the user. The operation unit 38 includes a plurality of operation buttons operated by the user. The user can operate the operation unit 38 to input a desired instruction.

Next, the electrical structure of the communication apparatus 12 will be described. The communication apparatus 12 includes a control unit 21 that controls the communication apparatus 12. The control unit 21 is electrically connected to the storage unit 22 and the communication unit 23. The control unit 21 includes a CPU, a ROM, and a RAM which are not shown. The CPU controls the operation of the communication apparatus 12 according to programs stored in the ROM and the storage unit 22. The RAM is a storage device that temporarily stores various kinds of data. The storage unit 22 is a non-volatile storage device, such as a hard disk drive. The storage unit 22 stores at least a second table 322 (see FIG. 4) and a third table 323 (see FIG. 5) which will be described below. The communication unit 23 is for communicating with other apparatuses connected to the network 2.

Figure 2:
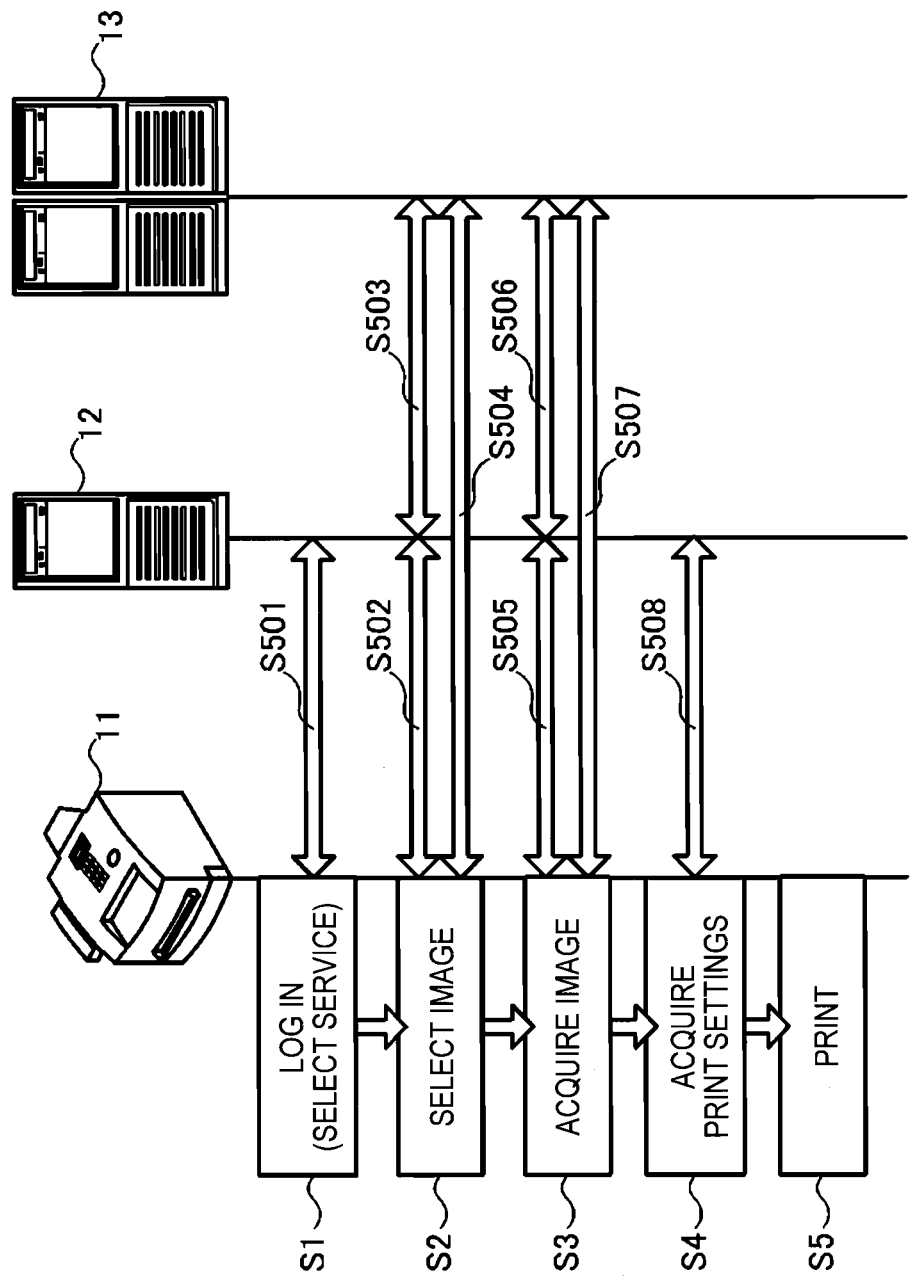
FIG. 2 is a diagram illustrating the outline of a printing sequence.

Next, the flow of an image printing process of the printing apparatus 11 will be described with reference to FIG. 2. The printing apparatus 11 receives a log-in operation of the user and performs user authentication (S1). The printing apparatus 11 receives an image selection operation of the authenticated user and specifies the image to be printed (S2). The printing apparatus 11 uses the services provided by the providing apparatus 13 to acquire the image selected by the user from the providing apparatus 13 (S3). The printing apparatus 11 acquires, from the communication apparatus 12, the print setting information when the image acquired from the providing apparatus 13 is printed (S4). The print setting information is registered for each service in the communication apparatus 12 by the user in advance. The communication apparatus 12 transmits the print setting information corresponding to the used service to the printing apparatus 11. The printing apparatus 11 prints the image which is acquired from the providing apparatus 13 in Step S3 on the basis of the print setting information which is acquired from the communication apparatus 12 in Step S4 (S5). The printing apparatus 11 can acquire the print setting information which is registered for each service by the user in advance from the communication apparatus 12 and print the image under appropriate printing conditions. Next, each process will be described.

The process in Step S1 and communication (S501) associated with the process in Step S1 will be described. The user logs into the printing apparatus 11. The user uses the operation unit 38 to input the type of desired service, an ID, and a password, thereby performing a log-in operation. The printing apparatus 11 specifies a registered password and an access token corresponding to the input ID with reference to the first table 321 (see FIG. 3) stored in the storage unit 32.

As shown in FIG. 3, the first table 321 stores IDs, registered passwords, and access tokens so as to be associated with each other. The information stored in the first table 321 is input by the administrator of the printing apparatus 11 in advance. The printing apparatus 11 specifies the registered password and access token corresponding to the input ID with reference to the first table 321. The printing apparatus 11 transmits information for specifying the type of service (hereinafter, referred to as "service information"), the input ID and password (hereinafter, the input password is referred to as an "input password"), and the registered password and the access token which are specified on the basis of the first table 321 to the communication apparatus 12. The communication apparatus 12 receives the service information, the ID, the input password, the registered password, and the access token (S501).

The communication apparatus 12 determines whether the user with the received ID can use a service corresponding to the service information received from the printing apparatus 11. For example, the communication apparatus 12 may inquire of the providing apparatus 13 whether the user can use the service, thereby performing the determination. The communication apparatus 12 compares the input password received from the printing apparatus 11 with the registered password. In addition, the communication apparatus 12 analyzes the access token to specify the access authority of the user corresponding to the ID.

The communication apparatus 12 determines whether to permit the use of the printing apparatus 11 by the logged-in user on the basis of whether the user can use the service, the comparison result of the passwords, and the specified access authority. The communication apparatus 12 transmits the determination result to the printing apparatus 11. The printing apparatus 11 receives the determination result (S501). The printing apparatus 11 displays the received determination result on the display unit 36 to notify the user whether the use of the printing apparatus 11 is permitted. The user who is permitted to use the printing apparatus 11 can use the services provided by the providing apparatus 13 through the printing apparatus 11. In addition, the user can print the image downloaded from the providing apparatus 13 using the printing apparatus 11.

Next, the process in Step S2 and communication (S502, S503, and S504) associated with Step S2 will be described. The user operates the operation unit 38 to select a desired image to be printed. The printing apparatus 11 transmits a request packet to the communication apparatus 12 in order to request a screen (hereinafter, referred to as an "image selection screen") which is displayed on the display unit 36 when the user selects the image. The communication apparatus 12 receives the request packet (S502).

As described above, the printing apparatus 11 acquires most of the images displayed on the display unit 36 from the communication apparatus 12 (the same holds for the following description). Among the images displayed on the display unit 36, a small number of images are stored in the storage unit 32 in advance. Therefore, the printing apparatus 11 can be driven even when the capacity of the storage unit 32 is small.

The communication apparatus 12 requesting the image selection screen transmits a message for requesting a list of the images that can be used by the user to the providing apparatus 13 that provides the service input by the user during the log-in operation. The providing apparatus 13 receives the message (S503). The message is an HTTP message which is created for each service using a unique API. The providing apparatus 13 requesting the list of the images transmits, to the communication apparatus 12, a URL (referred to as a "thumbnail URL") required to acquire the thumbnails of the images that can be used by the user. The communication apparatus 12 receives the thumbnail URL (S503).

The communication apparatus 12 receiving the thumbnail URL creates the XML text of the image selection screen to be displayed on the display unit 36 of the printing apparatus 11 on the basis of the thumbnail URL. The communication apparatus 12 transmits a message including the created XML text of the image selection screen to the printing apparatus 11. The communication apparatus 12 creates an HTTP message required to request the thumbnails of the images from the thumbnail URL and transmits the created HTTP message and the thumbnail URL to the printing apparatus 11. The printing apparatus 11 receives the information (S502).

The printing apparatus 11 performs rendering on the basis of the received message. The printing apparatus 11 transmits the received HTTP message to the thumbnail URL of the providing apparatus 13 in order to request the thumbnails of the images. The providing apparatus 13 receives the HTTP message (S504). The providing apparatus 13 transmits the thumbnails of the images to the printing apparatus 11 in response to the request by the HTTP message. The printing apparatus 11 receives the thumbnails of the images (S504). The printing apparatus 11 arranges the received thumbnails of the images and displays the image selection screen on the display unit 36. The user can select any one of the thumbnails of the images. The user selects a desired thumbnail of the image to be printed.

Next, the process in Step S3 and communication (S505, S506, and S507) associated with the process in Step S3 will be described. When the user selects the thumbnail of the image, the printing apparatus 11 transmits, to the communication apparatus 12, a URL (hereinafter, referred to as an "image URL") required to acquire an image corresponding to the selected thumbnail and a request packet that requests an HTTP message required to request the image from the image URL. The communication apparatus 12 receives the request packet (S505).

The communication apparatus 12 transmits an HTTP message requesting the image URL to the providing apparatus 13 that provides the service input by the user during the log-in operation. The providing apparatus 13 transmits the image URL to the communication apparatus 12. The communication apparatus 12 receives the image URL (S506). The communication apparatus 12 receiving the image URL creates an HTTP message required to request the image from the image URL and transmits the created HTTP message and the image URL to the printing apparatus 11. The printing apparatus 11 receives the information (S505).

The printing apparatus 11 transmits the received HTTP message to the image URL of the providing apparatus 13 in order to request the providing apparatus 13 to transmit the image selected by the user. The providing apparatus 13 receives the HTTP message (S507). The providing apparatus 13 transmits the image to the printing apparatus 11 in response to the request. The printing apparatus 11 receives the image (S507).

Next, the process in Step S4 and communication (S508) associated with the process in Step S4 will be described. The printing apparatus 11 transmits, to the communication apparatus 12, a request packet for requesting the print setting information when the image received from the providing apparatus 13 is printed. The communication apparatus 12 receives the request packet (S508). The communication apparatus 12 specifies the print setting information suitable for the service which is input by the user when the user logs into the printing apparatus 11, with reference to the second table 322 stored in the storage unit 22.

Figure 4:
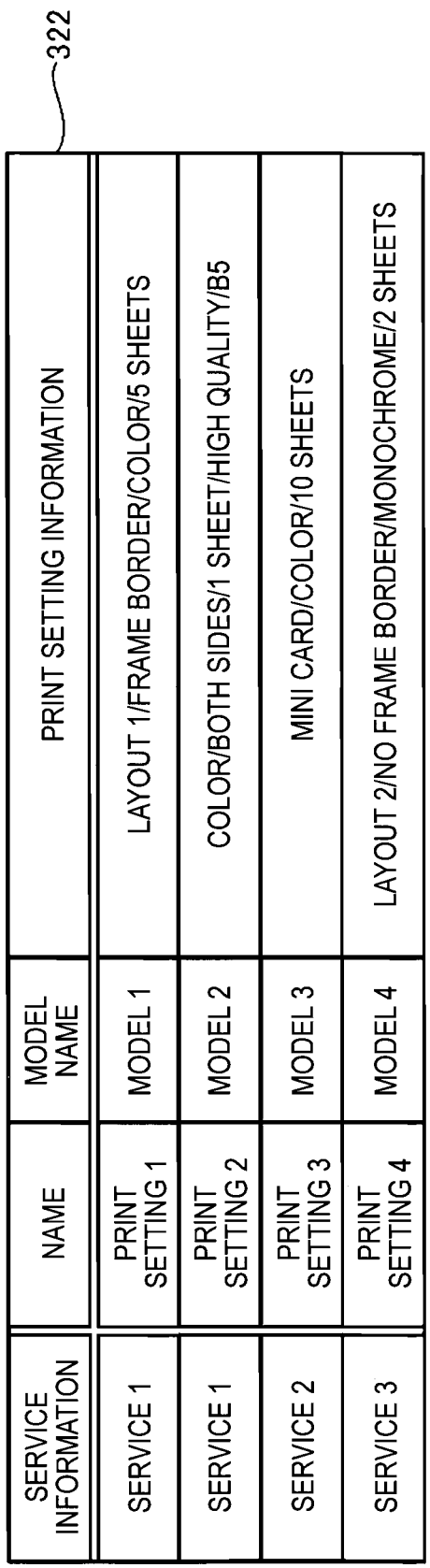
FIG. 4 is a diagram schematically illustrating a second table 322.

As shown in FIG. 4, the second table 322 stores service information, the name of print setting information, the model name of the printing apparatus 11, and the print setting information so as to be associated with each other. The information stored in the second table 322 is registered by the user of the printing apparatus 11 in advance. For example, when "service 1" is used in the printing apparatus 11 to acquire an image, the optimal print setting information is "layout 1/frame border/color/five sheets" or "color/both sides/one sheet/high quality/B5".

The print setting information includes a first print setting information item, which is print setting information for each service, and a second common print setting information item which does not depend on the service. For example, among the printing setting information items stored in the second table 322, "frame border", "high quality", "mini card", and "no frame border" correspond to the first print setting information item. The other information corresponds to a second print setting information item. The communication apparatus 12 can notify the first print setting information item and the second print setting information item to the printing apparatus 11. The printing apparatus 11 can acquire the first print setting information item and the second print setting information item from the communication apparatus 12 and print images on the basis of the acquired print setting information. Therefore, the printing apparatus 11 can acquire various kinds of print setting information without any loss and accurately print a high-quality image.

Then, the communication apparatus 12 compares the model name which is associated with the print setting information specified by the second table 322 with the model name of the printing apparatus 11 which is communicating. When the model names are different from each other, it is difficult to use the specified printing setting conditions in the printing apparatus 11 which is communicating, without any change. In this case, the communication apparatus 12 changes the specified print setting information into print setting information that can be applied to the printing apparatus 11 which is communicating. The print setting information is changed with reference to the third table 323 stored in the storage unit 22.

As shown in FIG. 5, the third table 323 stores the model name of the printing apparatus 11 and each item of the print setting information so as to be associated with each other. For example, when color settings "M1C" corresponding to a model name "model 1" are applied to the printing apparatus 11 with a model name "model 2", the color settings "M1C" may be changed into color settings "M2C". As such, reference to the third table 323 makes it possible to reliably specify print setting information that can be applied to any of a plurality of printing apparatuses 11 with different model names.

When the print setting information most suitable for each service is specified through the above-mentioned procedure, the communication apparatus 12 transmits the specified print setting information to the printing apparatus 11. The printing apparatus 11 receives the print setting information (S508).

In Step S5, the image acquired from the providing apparatus 13 in Step S3 is printed on the basis of the print setting information acquired from the communication apparatus 12 in Step S4.

Next, the process of the control unit 31 of the printing apparatus 11 or the control unit 21 of the communication apparatus 12 will be described with reference to FIGS. 6 to 20. A log-in process (see FIGS. 6 and 7) corresponds to the process in Step S1 of FIG. 2. An image acquiring process (see FIGS. 8 and 9) corresponds to the process in Steps S2 and S3 of FIG. 2. A printing process (see FIGS. 10 to 16) corresponds to the process in Steps S4 and S5 of FIG. 2. A registration process (see FIGS. 17 and 18) is performed when the user registers the printing setting information in the communication apparatus 12. A macro process (see FIGS. 19 and 20) is a collective process of Steps S3 to S5 of FIG. 2. The control unit 21 of the communication apparatus 12 performs a plurality of processes in parallel.

Next, the log-in process (printing apparatus) performed in the control unit 31 of the printing apparatus 11 will be described with reference to FIG. 6. When the user starts the log-in operation through the operation unit 38, the log-in process (printing apparatus) starts and is then performed.

Figure 21:
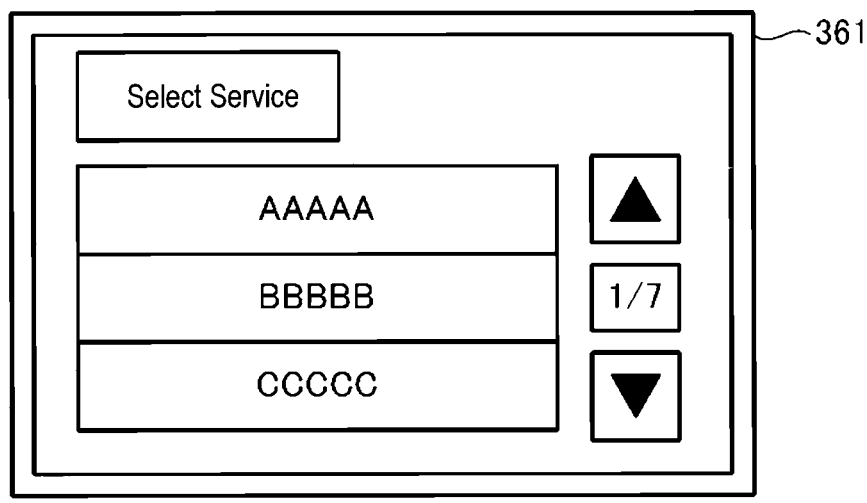
FIG. 21 is a diagram illustrating an example of a screen 361 displayed on a display unit 36 of the printing apparatus 11.

The service that is provided by the providing apparatus 13 and the user wants is input through the operation unit 38. The service information of the input service is received (S11). FIG. 21 shows a screen 361 displayed on the display unit 36 when the service is received from the user. The screen 361 shows the candidates for the services that can be used by the user. The user can operate the operation unit 38 to select a desired service.

Figure 6:
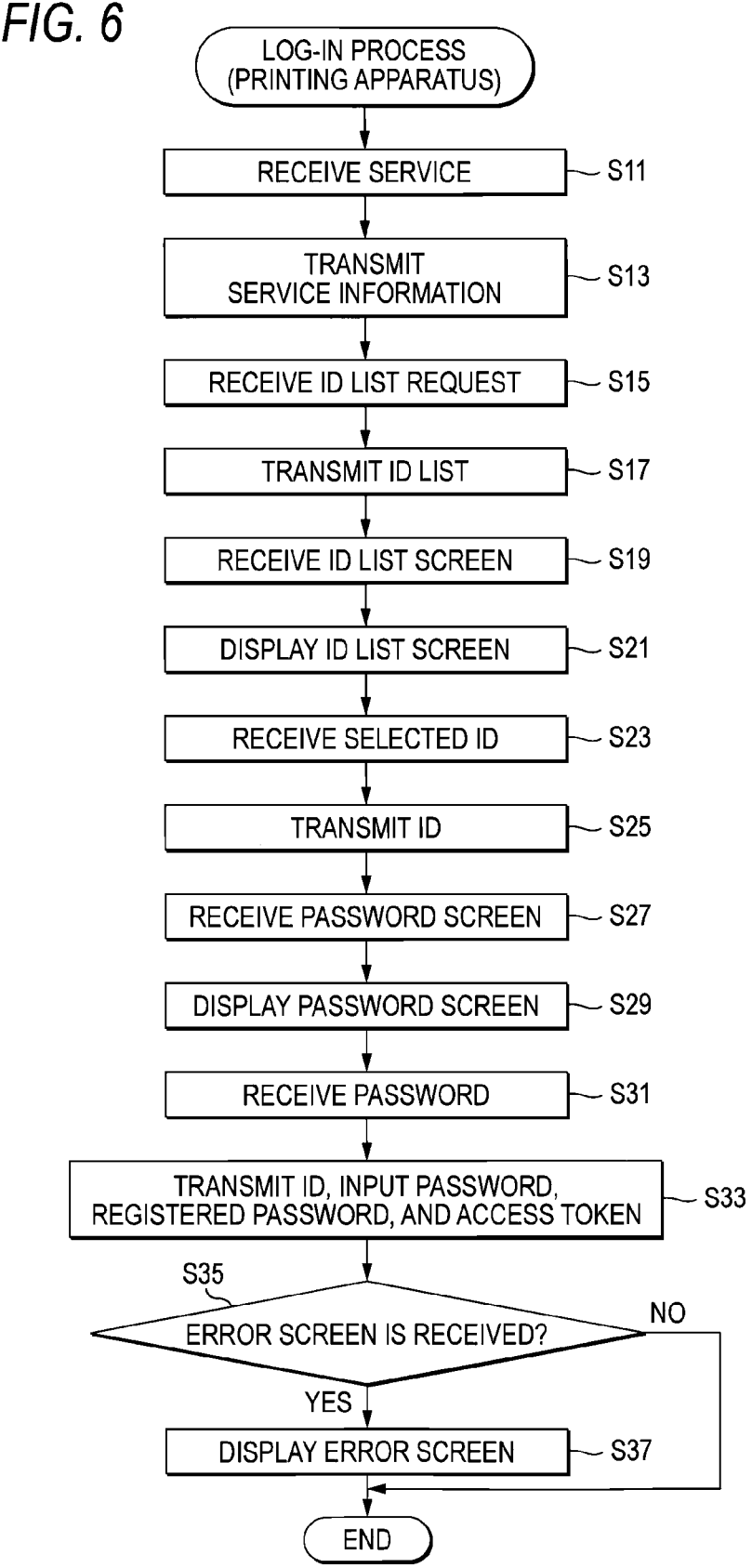
FIG. 6 is a flowchart illustrating a log-in process (printing apparatus)

As shown in FIG. 6, when the user selects a service using the operation unit 38, the service information of the selected service is transmitted to the communication apparatus 12 (S13). After the service information is transmitted, a request packet (see S43 in FIG. 7) for requesting an ID list is received from the communication apparatus 12 (S15). The ID list is a list of the IDs stored in the first table 321 (see FIG. 3). All of the stored IDs are extracted with reference to the first table 321. The extracted IDs are transmitted as the ID list to the communication apparatus 12 (S17).

After the ID list is transmitted, the ID list screen (see S47 in FIG. 7) transmitted from the communication apparatus 12 is received (S19). The ID list screen is displayed on the display unit 36 to provide the ID list transmitted in Step S17 to the user such that the user can select any one of the IDs in the ID list. The received ID list screen is displayed on the display unit 36 (S21). The user operates the operation unit 38 to select his or her own ID from the ID list screen displayed on the display unit 36. The selected ID is received (S23). The selected ID is transmitted to the communication apparatus 12 (S25).

After the ID is transmitted, the password screen (see S51 in FIG. 7) transmitted from the communication apparatus 12 is received (S27). The password screen is displayed on the display screen such that the user inputs the password. The received password screen is displayed on the display unit 36 (S29). The user operates the operation unit 38 to input the password with reference to the password screen displayed on the display unit 36. The input password is received (S31).

The access token and the registered password corresponding to the ID received in Step S23 are specified with reference to the first table 321 (see FIG. 3). The ID input in Step S23, the password (input password) input in Step S31, and the specified registered password and access token are transmitted to the communication apparatus 12 (S33).

After the ID is transmitted, it is determined whether an error screen (see S57 in FIG. 7) is received from the communication apparatus 12 (S35). The error screen is displayed on the display unit 36 in order to notify the user that the log-in of the user is not accepted and the user cannot use the printing apparatus 11. When the use of the printing apparatus 11 by the user is prohibited in the communication apparatus 12, the error screen is transmitted from the communication apparatus 12 (see S57 in FIG. 7). When the error screen is received (S35: YES), the received error screen is displayed on the display unit 36 (S37). The use of the printing apparatus 11 by the user who performs the log-in operation is prohibited. The log-in process (printing apparatus) ends. On the other hand, when the error screen is not received after a predetermined period of time has elapsed (S35: NO), the use of the printing apparatus 11 by the user who performs the log-in operation is permitted in the communication apparatus 12. The user can use the service using the printing apparatus 11 and receive and print images. The service information of the service received in Step S11 and the ID received in Step S23 are stored in the RAM. The log-in process (printing apparatus) ends.

Figure 7:
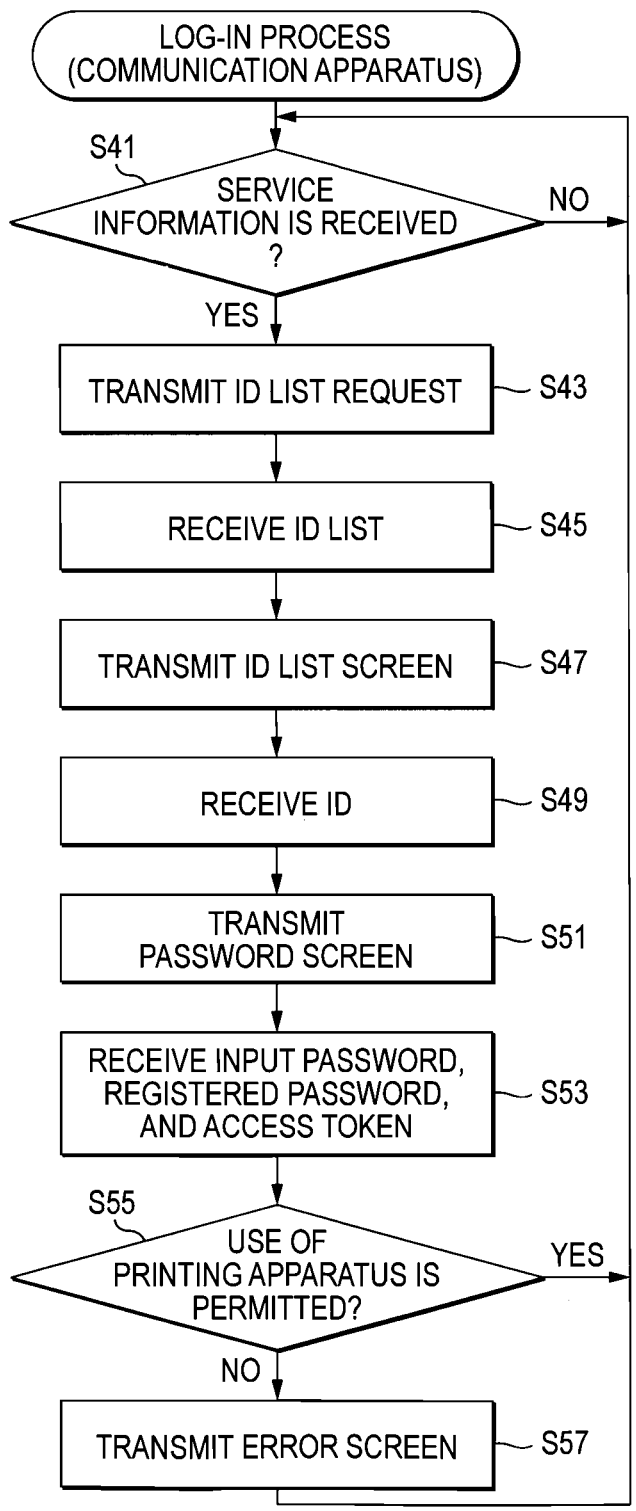
FIG. 7 is a flowchart illustrating the log-in process (communication apparatus)

Next, the log-in process (communication apparatus) performed in the control unit 21 of the communication apparatus 12 will be described with reference to FIG. 7. When the control unit 21 is turned on, the log-in process (communication apparatus) starts and is then performed.

The reception of the service information (see S13 in FIG. 6) from the printing apparatus 11 is monitored (S41). When the service information is not received (S41: NO), the process returns to Step S41. When the service information is received (S41: YES), a request packet for requesting the acquisition of the ID list is transmitted to the printing apparatus 11 (S43). After the request packet is transmitted, the ID list (see S17 in FIG. 6) transmitted from the printing apparatus 11 is received (S45).

The received ID list is presented to the user and an ID list screen for allowing the user to select any one of the IDs is created. The created ID list screen is transmitted to the printing apparatus 11 (S47). After the ID list screen is transmitted, the ID transmitted from the printing apparatus 11 is received (see S25 in FIG. 6) (S49). The password screen for allowing the user to input the password is transmitted to the printing apparatus 11 (S51). After the password screen is transmitted, the ID, the input password, the registered password, and the access token (see S33 in FIG. 6) transmitted from the printing apparatus 11 are received (S53).

It is determined whether the user with the ID received in Step S53 can use the service which is specified on the basis of the service information received in Step 41. In addition, it is determined whether the input password received in Step S53 is identical to the registered password. The received access token is analyzed to specify access authority. When the service can be used, the input password is identical to the registered password, and the access authority indicates that the use of the service and the printing of the image are permitted, it is determined that the user who is specified by the received ID is permitted to use the printing apparatus 11 (S55: YES). The service information received in Step S41 and the ID acquired in Step S53 are stored in the RAM. The process returns to Step S41.

On the other hand, when the service cannot be used, the input password received in Step S53 is not identical to the registered password, or the specified access authority indicates that the use of the service or the printing of the image is prohibited, it is determined that the use of the printing apparatus 11 by the user who is specified by the received ID is prohibited (S55: NO). In this case, an error screen for notifying the user that the use of the printing apparatus 11 is prohibited is transmitted to the printing apparatus 11 (S57). The process returns to Step S41.

Next, the image acquiring process (printing apparatus) performed in the control unit 31 of the printing apparatus 11 will be described with reference to FIG. 8. When an instruction to acquire an image using the service is input through the operation unit 38, the image acquiring process (printing apparatus) starts and is then performed.

The request packet for requesting the image selection screen is transmitted to the communication apparatus 12 (S61). After the request packet is transmitted, the image selection screen, the thumbnail URL, and the HTTP message (see S93 in FIG. 9) transmitted from the communication apparatus 12 are received (S63). The received HTTP message is transmitted to the thumbnail URL of the providing apparatus 13. After the HTTP message is transmitted, the thumbnails of the images transmitted from the providing apparatus 13 are received. The received thumbnails of the images are arranged on the basis of the received image selection screen and are displayed on the display unit 36 (S65).

The user selects the thumbnail of a desired image to be printed with reference to the image selection screen displayed on the display unit 36. The selected thumbnail of the image is received (S67). An image URL required to acquire the image corresponding to the received thumbnail and a request packet for requesting an HTTP message required to request the image from the image URL are transmitted to the communication apparatus 12 (S69). After the request packet is transmitted, the image URL and the HTTP message (see S99 in FIG. 9) transmitted from the communication apparatus 12 are received (S71).

After the image URL and the HTTP message are received, the received HTTP message is transmitted to the image URL of the providing apparatus 13 (S73). After the HTTP message is transmitted, the image transmitted from the providing apparatus 13 is received (S75). The received image is stored in the storage unit 32. In addition, the received image is transmitted to the communication apparatus 12 (S77).

After the image is transmitted, it is determined whether an error screen is received from the communication apparatus 12 (S79). The error image is displayed on the display unit 36 in order to notify the user that there is an error in the image received from the providing apparatus 13 and it is difficult to perform printing. When the communication apparatus 12 determines that there is an error in the image, the error screen is transmitted from the communication apparatus 12 (see S105 in FIG. 9). When the error screen is received (S79: YES), the received error screen is displayed on the display unit 36 (S81). The image received from the providing apparatus 13 is removed from the storage unit 32 and printing is prohibited. The image acquiring process (printing apparatus) ends.

When the error screen is not receive after a predetermined period of time has elapsed (S79: NO), it is determined that the image received from the providing apparatus 13 is normal and printing is available. The user can print the image which has been received from the providing apparatus 13 and then stored in the storage unit 32. The image acquiring process (printing apparatus) ends.

Figure 9:
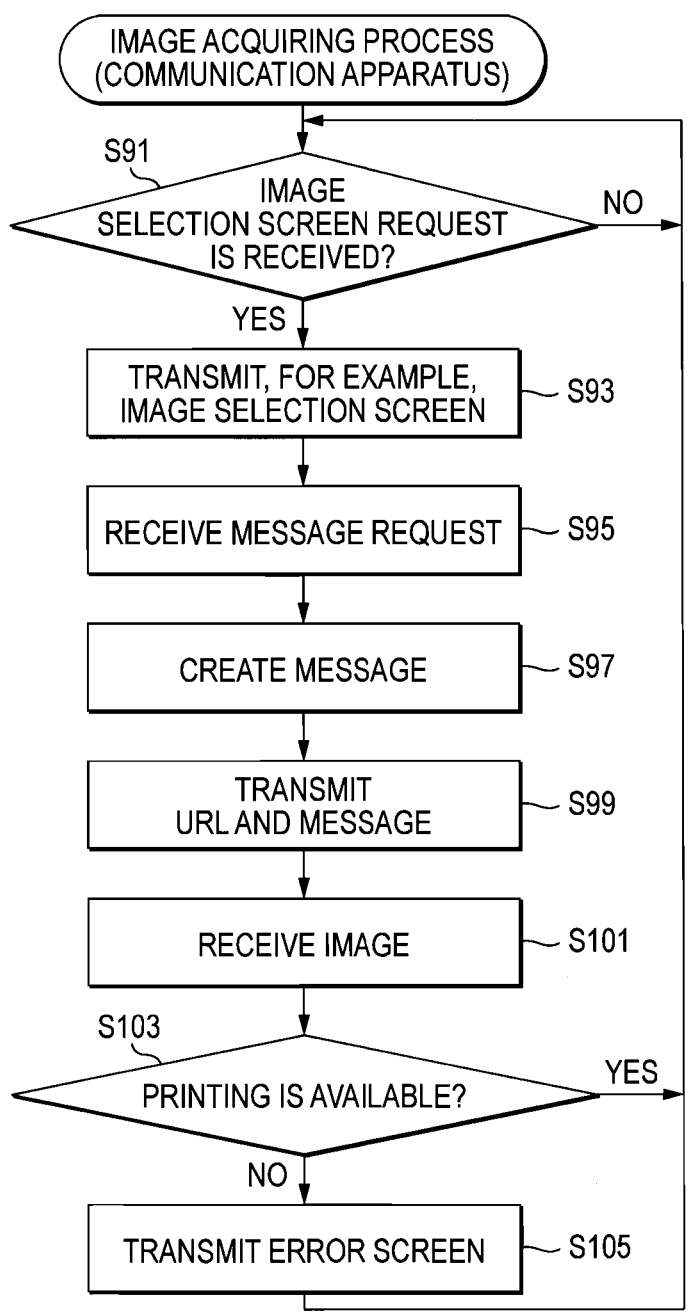
FIG. 9 is a flowchart illustrating the image acquiring process (communication apparatus)

Next, the image acquiring process (communication apparatus) performed in the control unit 21 of the communication apparatus 12 will be described with reference to FIG. 9. When the control unit 21 is turned on, the image acquiring process (communication apparatus) starts and is then performed.

The reception of the request packet (see S61 in FIG. 8) for requesting the image selection screen from the printing apparatus 11 is monitored (S91). When the request packet for requesting the image selection screen is not received (S91: NO), the process returns to Step S91. When the request packet for requesting the image selection screen is received (S91: YES), the service information which has been received from the printing apparatus 11 and then stored in the RAM in Step S41 (see FIG. 7) is read. An HTTP message for requesting a list of the images that can be used by the user is transmitted to the providing apparatus 13 that provides the services specified on the basis of the read service information. After the HTTP message is transmitted, the thumbnail URL transmitted from the providing apparatus 13 is received. The image selection screen is created on the basis of the received thumbnail URL. In addition, an HTTP message required to request the providing apparatus 13 to transmit the thumbnails of the images is created. The image selection screen, the thumbnail URL, and the HTTP message are transmitted to the printing apparatus 11 (S93).

For example, when the image selection screen is transmitted, a request packet (see S69 in FIG. 8) for requesting the creation of an HTTP message required to request the providing apparatus 13 to transmit an image URL and an image is received from the printing apparatus 11 (S95). The HTTP message for requesting the image URL is transmitted to the providing apparatus 13 which provides the services specified on the service information read from the RAM. After the HTTP message is transmitted, the image URL transmitted from the providing apparatus 13 is received. The HTTP message required to request the image from the received image URL is created (S97). The image URL and the created HTTP message are transmitted to the printing apparatus 11 (S99).

Figure 8:
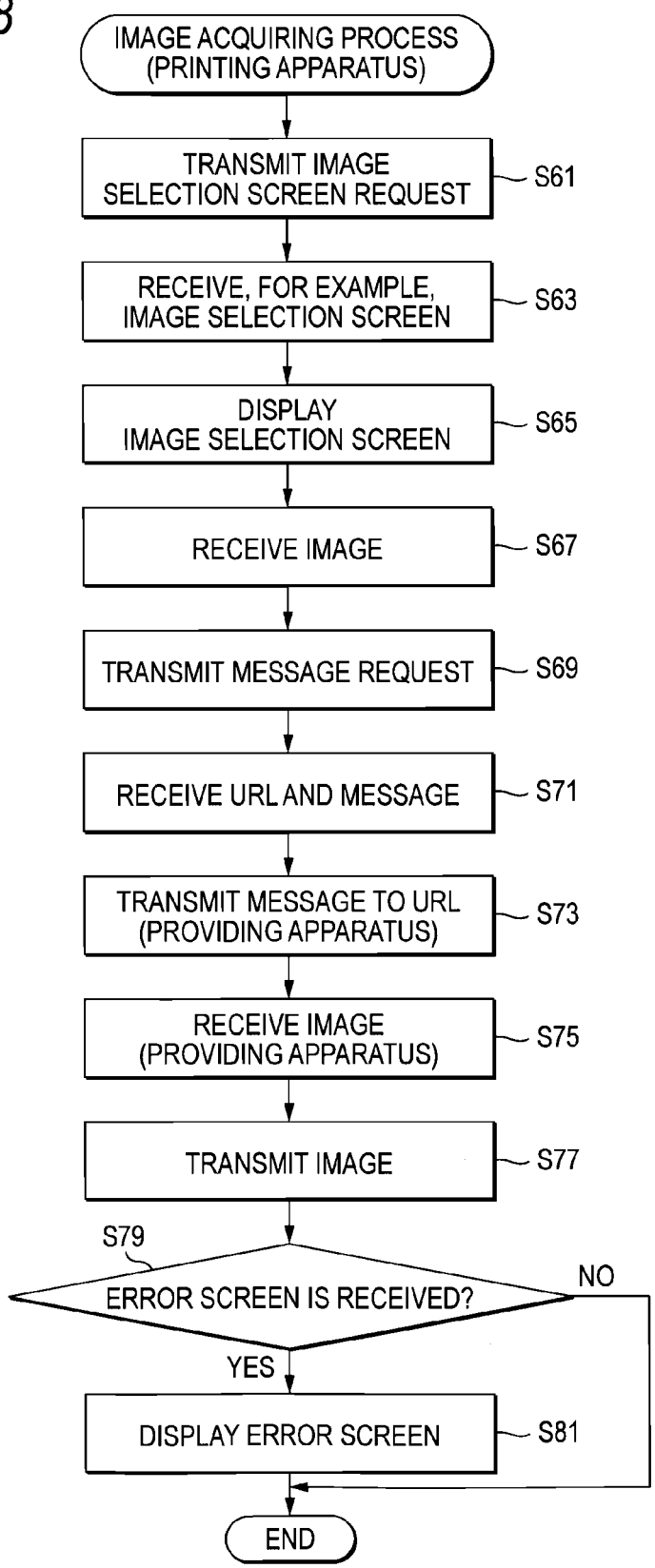
FIG. 8 is a flowchart illustrating an image acquiring process (printing apparatus)

After the image URL and the HTTP message are transmitted, the printing apparatus 11 receives the image from the providing apparatus 13 (see S75 in FIG. 8). The printing apparatus 11 transmits the received image to the communication apparatus 12 (see S77 in FIG. 8). The image transmitted from the printing apparatus 11 is received (S101).

It is determined whether the received image can be printed by the printing apparatus 11 (S103). When no error is detected from the received image and it is determined that the printing apparatus 11 can print the image (S103: YES), the process returns to Step S91. On the other hand, when there is an error in the received image and it is determined that the printing apparatus 11 cannot print the image (S103: NO), an error screen notifying the user that there is an error in the image is transmitted to the printing apparatus 11 (S105). The process returns to Step S91.

Figure 10:
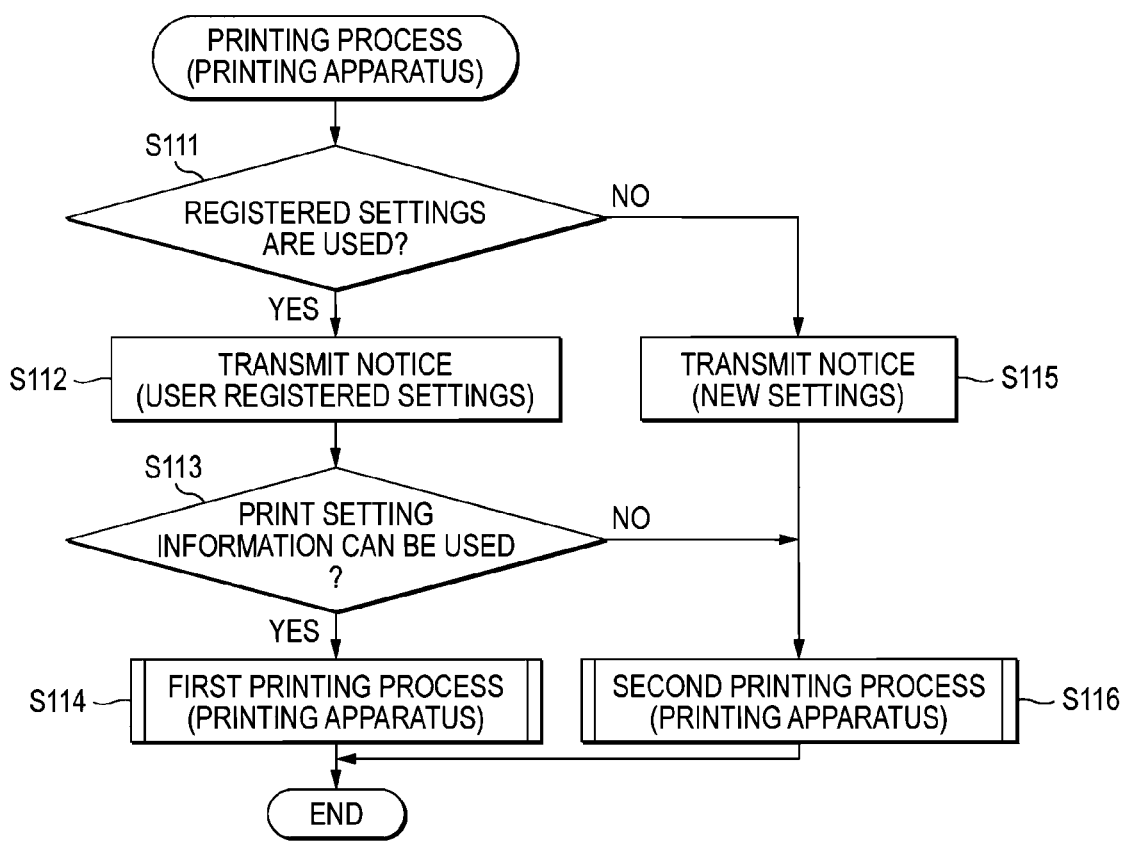
FIG. 10 is a flowchart illustrating a printing process (printing apparatus)

Next, the printing process (printing apparatus) performed in the control unit 31 of the printing apparatus 11 will be described with reference to FIG. 10. When an instruction to print the image acquired from the providing apparatus 13 is input through the operation unit 38, the printing process (printing apparatus) starts and is then performed.

It is determined whether to perform printing using the print setting information which is registered in the communication apparatus 12 in advance (S111). When the user uses the operation unit 38 to input information indicating the use of the print setting information registered in the communication apparatus 12 (S111: YES), a notice indicating the use of the registered print setting information is transmitted to the communication apparatus 12 (S112). When the print setting information is not registered in the communication apparatus 12, a notice indicating that the setting information unit is not registered is transmitted to the communication apparatus 12 (see S123 in FIG. 11). When the notice indicating that the print setting information is not registered is received, it is difficult to acquire the print setting information from the communication apparatus 12 and use it (S113: NO). In this case, the process proceeds to Step S116. On the other hand, when indicating that the print setting information is not registered is not received after a predetermined period of time has elapsed, it is determined that the print setting information registered in the communication apparatus 12 can be used (S113: YES). In this case, a process (first printing process (printing apparatus); see FIG. 12) of performing printing on the basis of the registered print setting information is performed (S114). The first printing process (printing apparatus) will be described in detail below. After the first printing process (printing apparatus) ends, the printing process (printing process) ends.

When the user inputs information indicating that newly input setting information is used (S111: NO), a notice indicating that the print setting information is set is transmitted to the communication apparatus 12 (S115). A process (second printing process (printing apparatus); see FIGS. 14 and 15) of performing printing on the basis of the input print setting information is performed (S116). The second printing process (printing apparatus) will be described in detail below. After the second printing process (printing apparatus) ends, the printing process (printing apparatus) ends.

Figure 11:
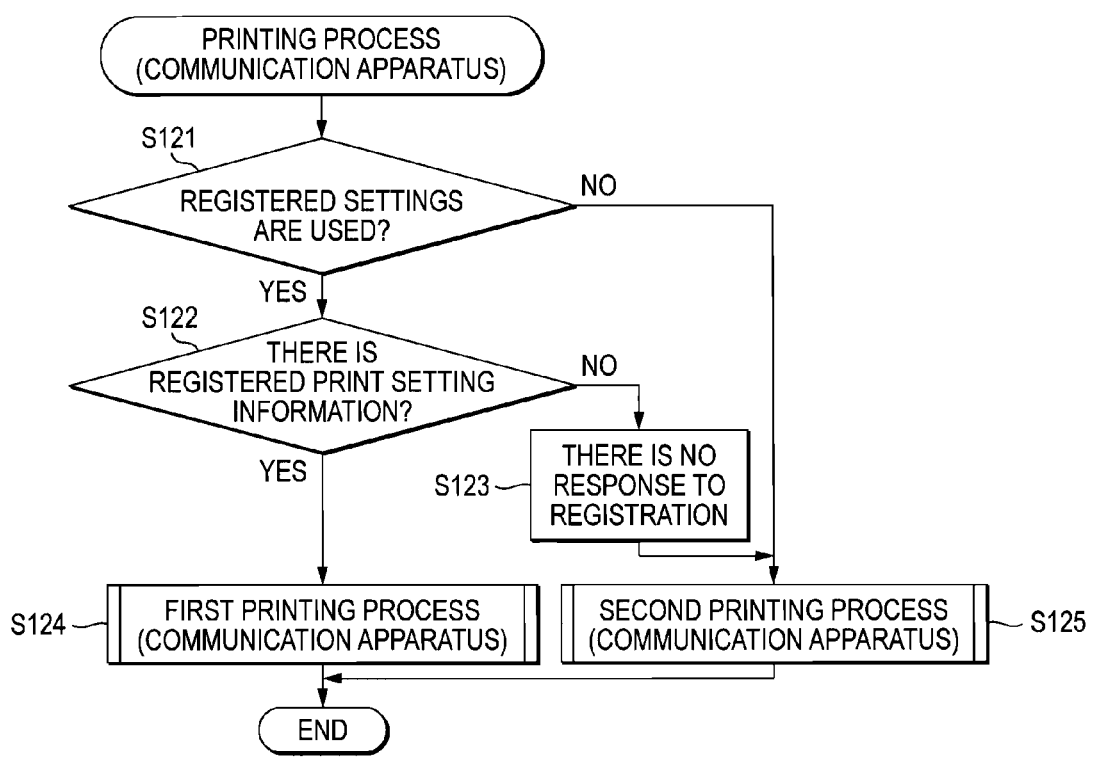
FIG. 11 is a flowchart illustrating the printing process (communication apparatus)

Next, the printing process (communication apparatus) performed in the control unit 21 of the communication apparatus 12 will be described with reference to FIG. 11. When the notice transmitted (see S112 and S115 in FIG. 10) from the printing apparatus 11 is received, the printing process (communication apparatus) starts and is then performed.

The content of the notice received from the printing apparatus 11 is determined (S121). When the notice indicates that printing is performed on the basis of the registered print setting information (S121: YES), the service information stored in the RAM is read. It is determined whether the print setting information corresponding to the read service information is stored in the second table 322 (see FIG. 4) (S122). When the print setting information is stored in the second table 322 (S122: YES), a process (first printing process (communication apparatus); see FIG. 13) of transmitting the print setting information stored in the second table 322 (see FIG. 4) to the printing apparatus 11 and directing the printing apparatus 11 to perform printing is performed (S124). After the first printing process (communication apparatus) ends, the printing process (communication apparatus) ends. On the other hand, when the print setting information corresponding to the service information read from the RAM is not stored in the second table 322 (S122: NO), a notice indicating that no print setting information is registered is transmitted to the printing apparatus 11 (S123). Then, the process proceeds to Step S125.

When the received notice indicates that printing is performed on the basis of newly input print setting information (S121: NO), a process (second printing process (communication apparatus); see FIG. 16) of storing the newly input print setting information in the second table 322 (see FIG. 4) and directing the printing apparatus 11 to perform printing on the basis of the input print setting information is performed (S125). After the second printing process (communication apparatus) ends, the printing process (communication apparatus) ends.

Figure 22:
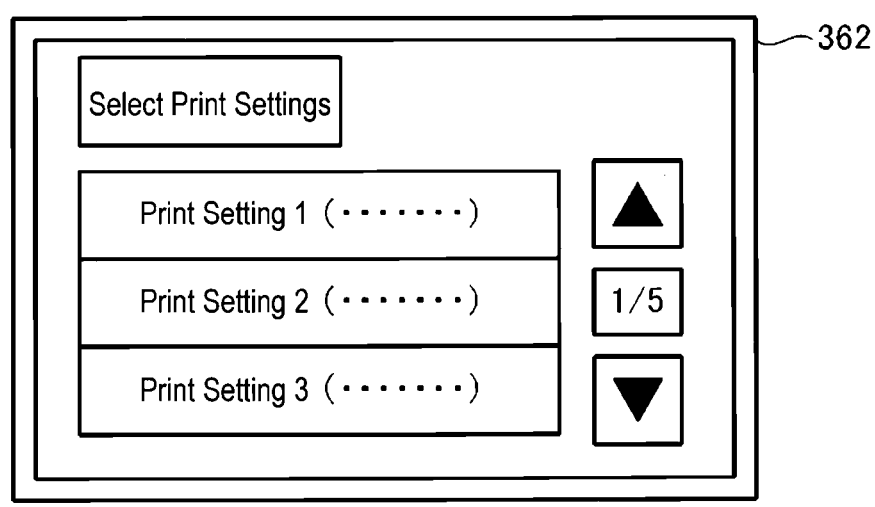
FIG. 22 is a diagram illustrating an example of a setting selection screen 362 displayed on the display unit 36 of the printing apparatus 11.

Next, the first printing process (printing apparatus) will be described with reference to FIG. 12. When a selection screen (hereinafter, referred to as a "setting selection screen") that enables the user to select any one of a plurality of print setting information items is transmitted from the communication apparatus 12 (see S161 in FIG. 13), the setting selection screen is received (S131). The received setting selection screen is displayed on the display unit 36 (S133). FIG. 22 shows a displayed setting selection screen 362. The candidates of the names of the print setting information items that can be selected by the user are displayed on the setting selection screen 362. The user can operate the operation unit 38 to select the name of a desired printing setting information item. As such, the user can select a desired printing setting condition from a plurality of printing setting conditions and can print the image on the basis of the selected printing setting condition. All of the selected print setting information items are stored in the second table 322 (see FIG. 4) so as to be associated with the services which are input by the user during the log-in operation. Therefore, even when any of the print setting information items is selected, the image is printed with the quality that the user wants.

Figure 12:
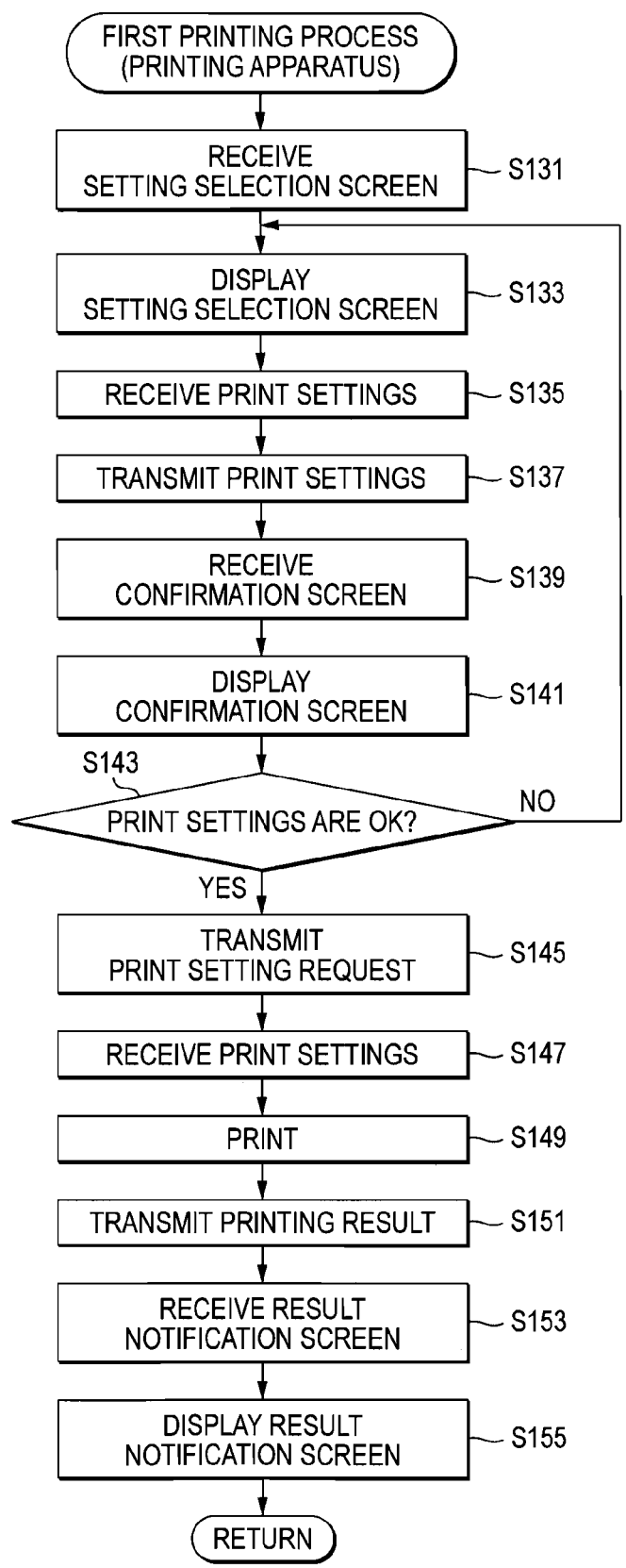
FIG. 12 is a flowchart illustrating a first printing process (printing apparatus)

As shown in FIG. 12, when the user selects any one of the names of the print setting information items, the selected name of the print setting information is received (S135). The received name of the printing setting information is transmitted to the communication apparatus 12 (S137). After the name of the print setting information is transmitted, a confirmation screen (see S165 in FIG. 13) transmitted from the communication apparatus 12 is received (S139). The confirmation screen is for presenting the printing conditions forming the print setting information received in Step S135 to the user and prompting the user to check whether there is a problem in the selected print setting information. The received confirmation screen is displayed on the display unit 36 (S141).

The user checks the content of the selected print setting information and determines whether there is a problem in the input content. The user uses the operation unit 38 to input the determination result. When there is a problem in the content of the selected print setting information (S143: NO), the process returns to Step S133 such that the user can select other print setting information items. On the other hand, when there is no problem in the selected print setting information (S143: YES), the process proceeds to Step S145.

A request packet for requesting the communication apparatus 12 to transmit the name of the print setting information which is received from the user in Step S135 is transmitted to the communication apparatus 12 (S145). The request packet includes the model name of the printing apparatus 11. After the request packet is transmitted, the print setting information (see S171 in FIG. 13) transmitted from the communication apparatus 12 is received (S147). The image which has been received from the providing apparatus 13 and then stored in the storage unit 32 by the image acquiring process (printing apparatus) (see FIG. 8) is printed on the basis of the print setting information received in Step S147 (S149).

The printing result indicating whether the printing of the image ends normally is transmitted to the communication apparatus 12 (S151). After the printing result is transmitted, a result notification screen (see S175 in FIG. 13) transmitted from the communication apparatus 12 is received (S153). The result notification screen is for notifying the user whether the printing operation performed in Step S149 ends normally. The received result notification screen is displayed on the display unit 36 (S155). The first printing process (printing apparatus) ends and the process returns to the printing process (printing apparatus) (see FIG. 10).

Figure 13:
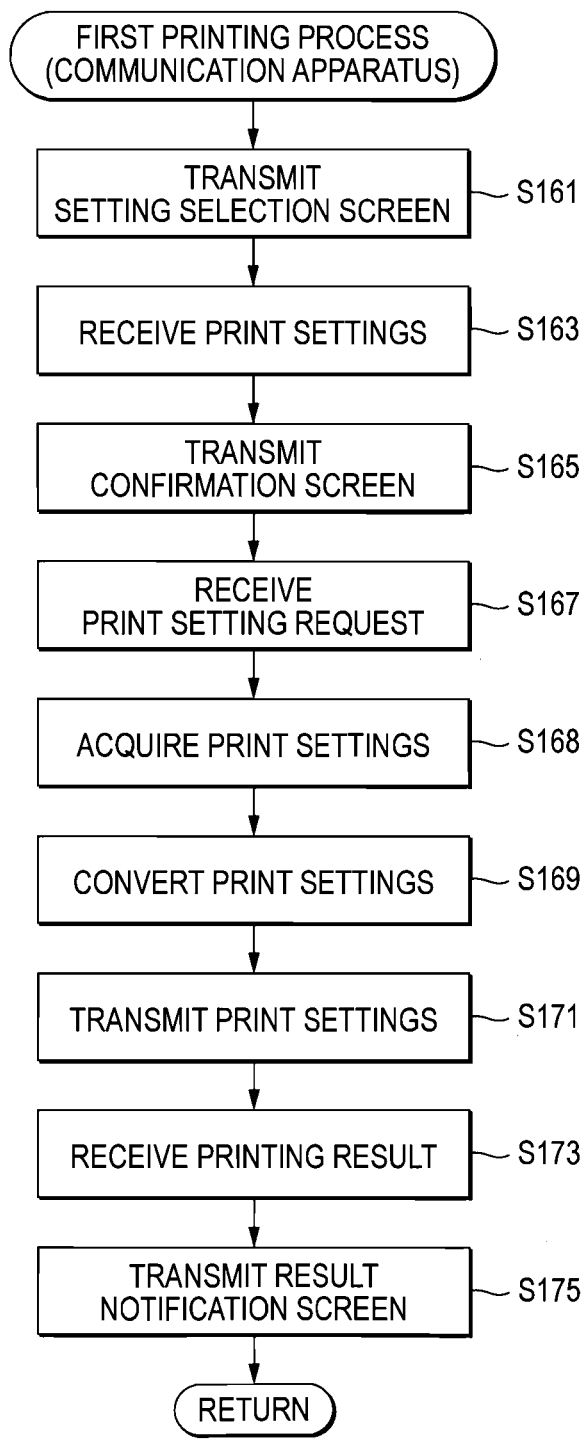
FIG. 13 is a flowchart illustrating the first printing process (communication apparatus)

Next, the first printing process (communication apparatus) will be described with reference to FIG. 13. The print setting information items associated with the services which are stored in the RAM are extracted with reference to the second table 322 (see FIG. 4). The setting selection screen capable of selecting any one of the extracted print setting information items is created. The created setting selection screen is transmitted to the printing apparatus 11 (S161).

After the setting selection screen is transmitted, the name of the print setting information (see S137 in FIG. 12) transmitted from the printing apparatus 11 is received S163). The print setting information corresponding to the received name is specified with reference to the second table 322 (see FIG. 4). A confirmation screen for presenting the printing conditions forming the specified print setting information to the user is created. The created confirmation screen is transmitted to the printing apparatus 11 (S165).

When a request packet for requesting the print setting information is transmitted from the printing apparatus 11 after the confirmation screen is transmitted (see S145 in FIG. 12), the request packet is received (S167). The print setting information corresponding to the print setting information name received in Step S163 is acquired from the second table 322 (see FIG. 4) (S168). In addition, the model name stored in the received request packet is acquired.

When the model name acquired from the request packet is different from the model name associated with the print setting information which is acquired in Step S168, it is necessary to change the print setting information such that the acquired print setting information can be used in the printing apparatus 11 which is communicating. The print setting information acquired in Step S168 is converted with reference to the third table 323 (see FIG. 5) (S169). The converted print setting information is transmitted to the printing apparatus 11 (S171). As described above, the communication apparatus 12 can convert the print setting information according to the type (model name) of printing apparatus 11 and notify the converted print setting information to the printing apparatus 11. In this way, the printing apparatus 11 can reliably print images on the basis of the print setting information acquired from the communication apparatus 12.

When the printing result is transmitted from the printing apparatus 11 after the print setting information is transmitted (see S151 in FIG. 12), the printing result is received (S173). The result notification screen for notifying the user whether printing ends normally in the printing apparatus 11 is created on the basis of the received printing result. The created result notification screen is transmitted to the printing apparatus 11 (S175). The first printing process (communication apparatus) ends and the process returns to the printing process (communication apparatus) (see FIG. 11).

In the first printing process (communication apparatus), the setting selection screen capable of selecting any one of a plurality of print setting information items extracted from the second table 322 (see FIG. 4) is created and transmitted to the printing apparatus 11. The user of the printing apparatus 11 selects desired print setting information with reference to the setting selection screen displayed on the display unit 36. However, the invention is not limited thereto. For example, when one print setting information item is extracted from the second table 322, the print setting information item may be transmitted to the printing apparatus 11 as the print setting information when the printing apparatus 11 prints images. The printing apparatus 11 may print images on the basis of the received print setting information. In addition, any one of a plurality of print setting information items extracted from the second table 322 may be transmitted to the printing apparatus 11 as the print setting information when the printing apparatus 11 prints images.

Figure 23:
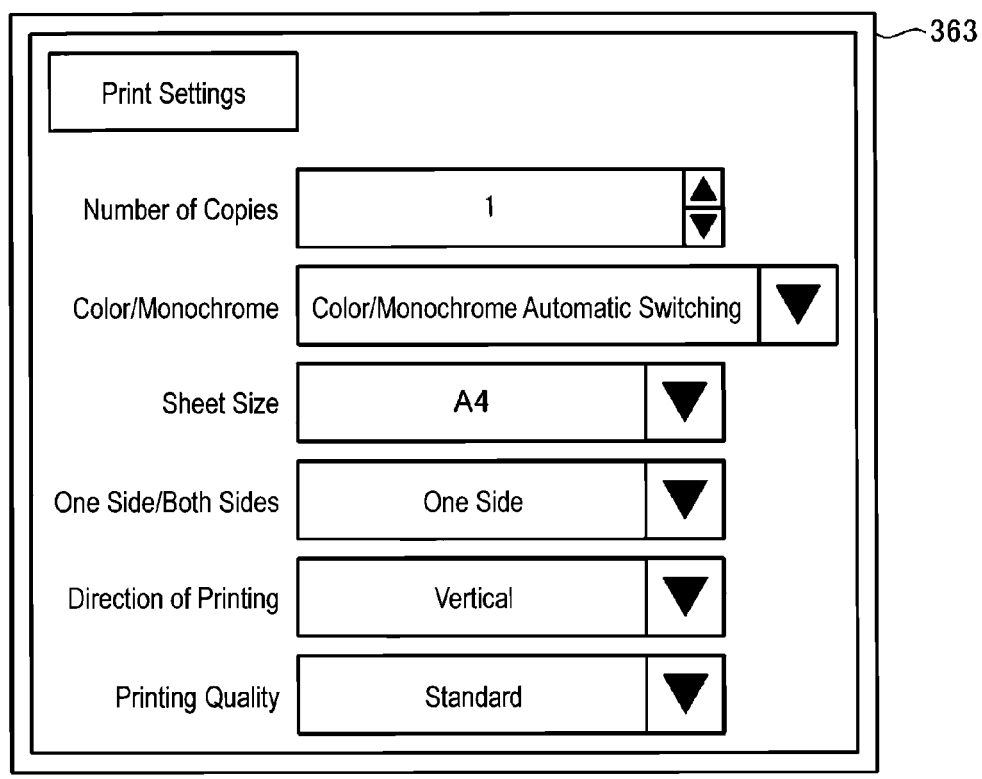
FIG. 23 is a diagram illustrating an example of a setting input screen 363 displayed on the display unit 36 of the printing apparatus 11.

Next, the second printing process (printing apparatus) will be described with reference to FIGS. 14 and 15. When an input screen (hereinafter, referred to as a "setting input screen") capable of inputting the print setting information is transmitted from the communication apparatus 12 (see S221 in FIG. 16), the setting input screen is received (S181). The received setting input screen is displayed on the display unit 36 (S183). FIG. 23 shows the displayed setting input screen 363. A plurality of pull-down menus is displayed on the setting input screen 363 such that the user can select each of the printing conditions forming the print setting information. The user can use the operation unit 38 to select and input a desired printing condition.

Figure 14:
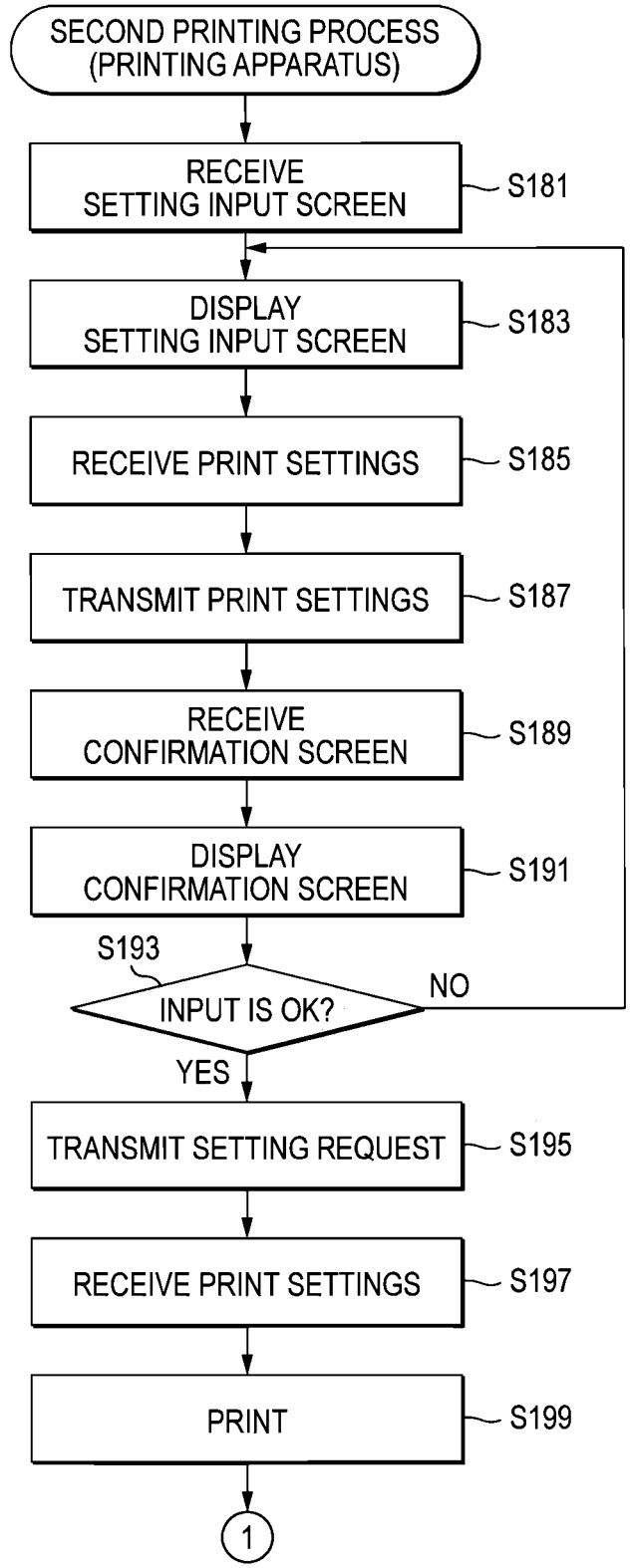
FIG. 14 is a flowchart illustrating a second printing process (printing apparatus)
Figure 15:
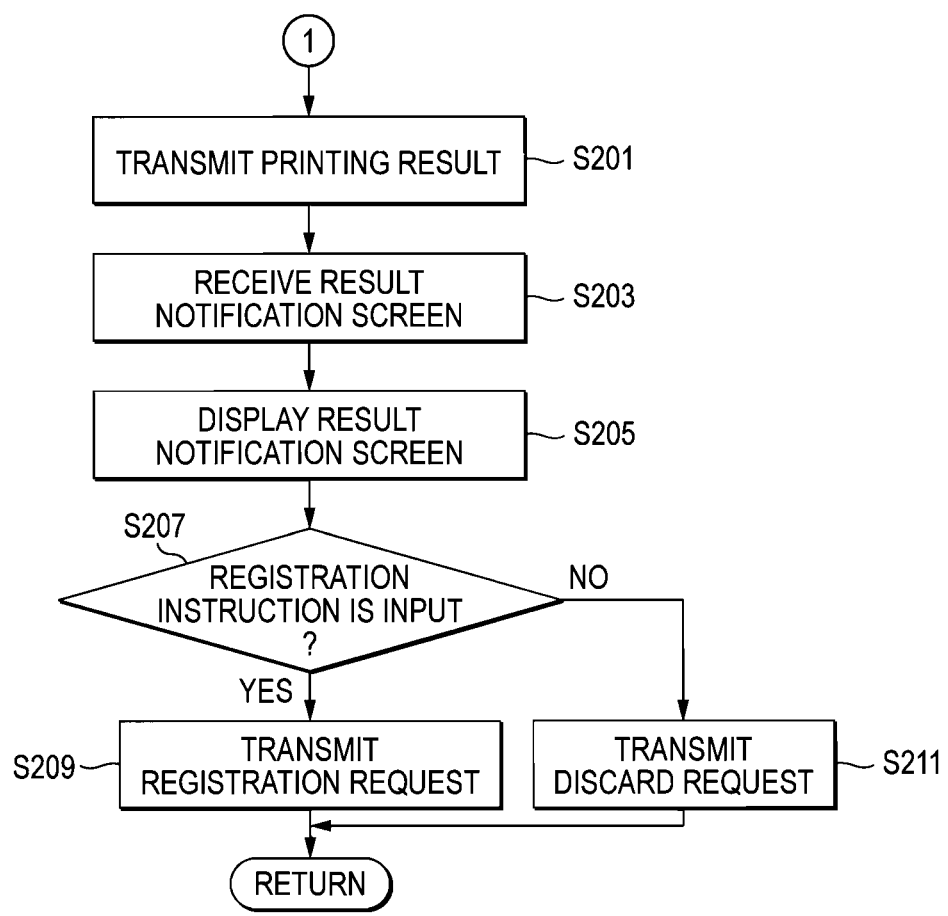
FIG. 15 is a flowchart illustrating the second printing process (printing apparatus) following FIG. 14.

As shown in FIG. 14, when the user selects and inputs each of the printing conditions forming the print setting information, each of the input printing conditions is received (S185). The print setting information including the received printing conditions and the model name of the printing apparatus 11 are transmitted to the communication apparatus 12 (S187). After the print setting information is transmitted, the confirmation screen (see S225 in FIG. 16) transmitted from the communication apparatus 12 is received (S189). The confirmation screen is for presenting the printing conditions forming the print setting information received in Step S185 to the user and prompting the user to check whether desired content is in the input print setting information. The received confirmation screen is displayed on the display unit 36 (S191).

The user checks the content of the input print setting information and determines whether there is a problem in the input content. The user uses the operation unit 38 to input the determination result. When there is a problem in the content of the print setting information displayed on the confirmation screen (S193: NO), the process returns to Step S183 such that the user can input other print setting information items again. On the other hand, when there is no problem in the content of the print setting information displayed on the confirmation screen (S193: YES), it is determined that the print setting information is input normally and the process proceeds to Step S195.

A request packet for requesting the communication apparatus 12 to transmit the print setting information received in Step S185 is transmitted to the communication apparatus 12 (S195). After the request packet is transmitted, the print setting information (see S231 in FIG. 16) transmitted from the communication apparatus 12 is received (S197). The image which has been received from the providing apparatus 13 and then stored in the storage unit 32 by the image acquiring process (printing apparatus) (see FIG. 8) is printed on the basis of the print setting information received in Step S197 (S199). As shown in FIG. 15, the printing result indicating whether the printing of the image ends normally is transmitted to the communication apparatus 12 (S201). After the printing result is transmitted, the result notification screen (see S237 in FIG. 16) transmitted from the communication apparatus 12 is received (S203). The received result notification screen is displayed on the display unit 36 (S205).

The user uses the operation unit 38 to input an instruction indicating whether to register the print setting information which is input by the user in Step S185 (see FIG. 14) in the communication apparatus 12. When an instruction to register the print setting information is input (S207: YES), a request packet for requesting the registration of the print setting information transmitted to the communication apparatus 12 in Step S187 (see FIG. 14) is transmitted to the communication apparatus 12 (S209). The second printing process (printing apparatus) ends and the process returns to the printing process (printing apparatus) (see FIG. 10). On the other hand, when an instruction not to register the print setting information is input (S207: NO), a request packet for requesting the discarding of the print setting information transmitted to the communication apparatus 12 in Step S187 is transmitted to the communication apparatus 12 (S211). The second printing process (printing apparatus) ends and the process returns to the printing process (printing apparatus) (see FIG. 10).

In the above description, the image is printed on the basis of the print setting information received from the communication apparatus 12, but the invention is not limited thereto. For example, the print setting information received in Step S185 may be stored in the storage unit 32. The image may be printed on the basis of the print setting information stored in the storage unit 32.

Figure 16:
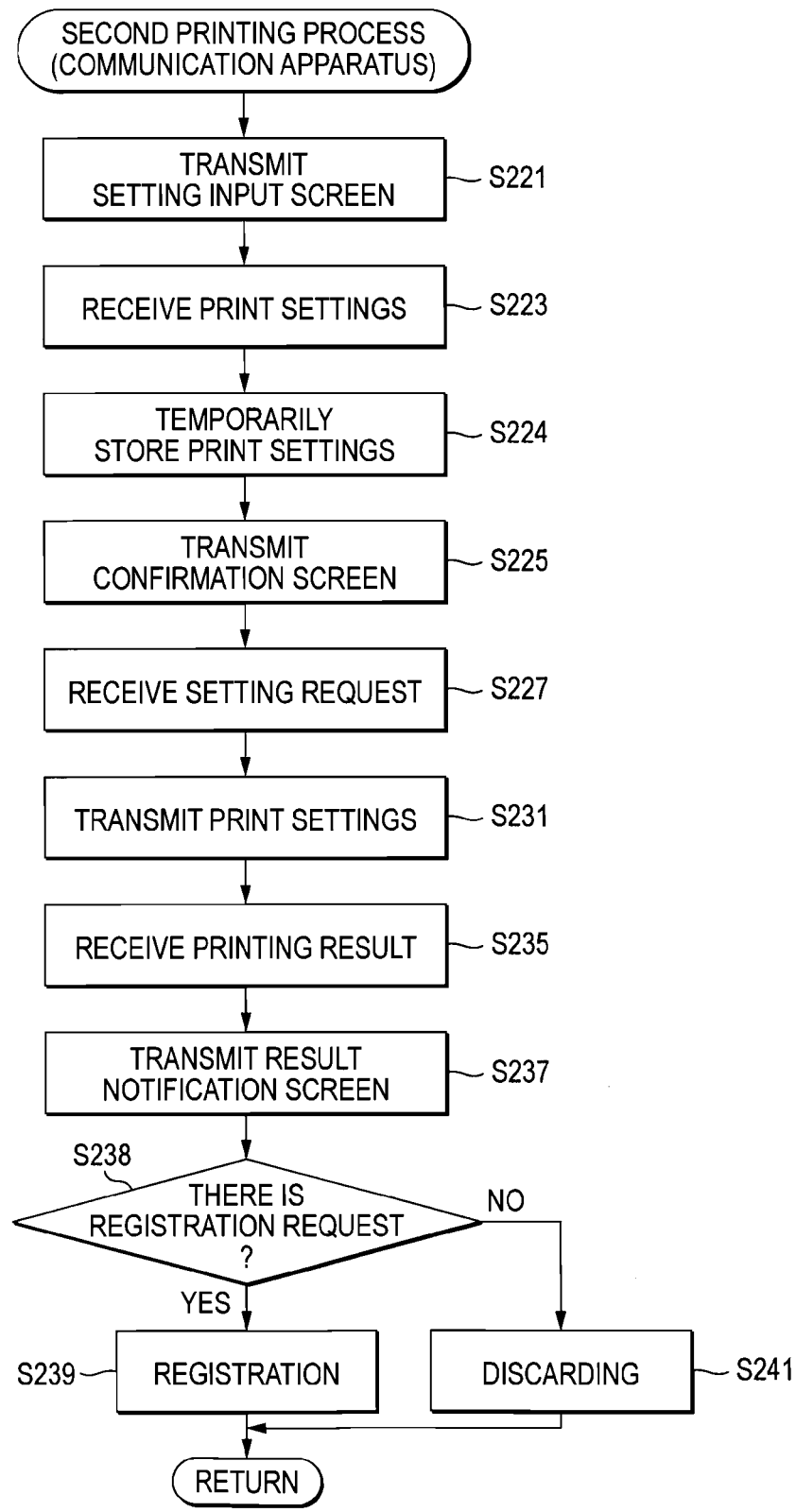
FIG. 16 is a flowchart illustrating the second printing process (communication apparatus)

Next, the second printing process (communication apparatus) will be described with reference to FIG. 16. The setting input screen is transmitted to the printing apparatus 11 (S221). After the setting input screen is transmitted, the print setting information (see S187 in FIG. 14) and the model name transmitted from the printing apparatus 11 are received (S223). The received print setting information and model name are temporarily stored in the RAM (S224). A confirmation screen for presenting the printing conditions forming the received print setting information to the user is created. The created confirmation screen is transmitted to the printing apparatus 11 (S225).

When a request packet for requesting the print setting information is transmitted from the printing apparatus 11 after the confirmation screen is transmitted (see S195 in FIG. 14), the request packet is received (S227). The requested print setting information is stored in the RAM (see S224). The print setting information stored in the RAM is read and transmitted to the printing apparatus 11 (S231). When the printing result is transmitted from the printing apparatus 11 after the print setting information is transmitted (see S201 in FIG. 15), the printing result is received (S235). A result notification screen for notifying the user whether printing ends normally in the printing apparatus 11 is created on the basis of the received printing result. The created result notification screen is transmitted to the printing apparatus 11 (S237).

After the result notification screen is transmitted, the request packet (see S209 and S211 in FIG. 15) transmitted from the printing apparatus 11 is received (S238). When the request packet requests the registration of the print setting information (S238: YES), the print setting information and the model name stored in the RAM are stored in the second table 322 (see FIG. 4). The service information stored in the RAM is associated with the stored print setting information. The name of the print setting information is stored. In this way, the print setting information is registered in the communication apparatus 12 (S239). The second printing process (communication apparatus) ends and the process returns to the printing process (communication apparatus) (see FIG. 11). In this way, it is possible to register, in the second table 322, the print setting information input to the printing apparatus 11 when an image is printed. Therefore, even when the print setting information is not registered in the communication apparatus 12 in advance, the user can register the printing setting information which is newly input during printing in the communication apparatus 12. In addition, the user can register the print setting information used during printing in the communication apparatus 12, regardless of whether the print setting information is registered in the communication apparatus 12. Therefore, the convenience of the printing system 1 is improved.

When the request packet does not request the registration of the print setting information (S238: NO), the print setting information and the model name stored in the RAM are removed and discarded (S241). The second printing process (communication apparatus) ends and the process returns to the printing process (communication apparatus) (see FIG. 11).

Figure 17:
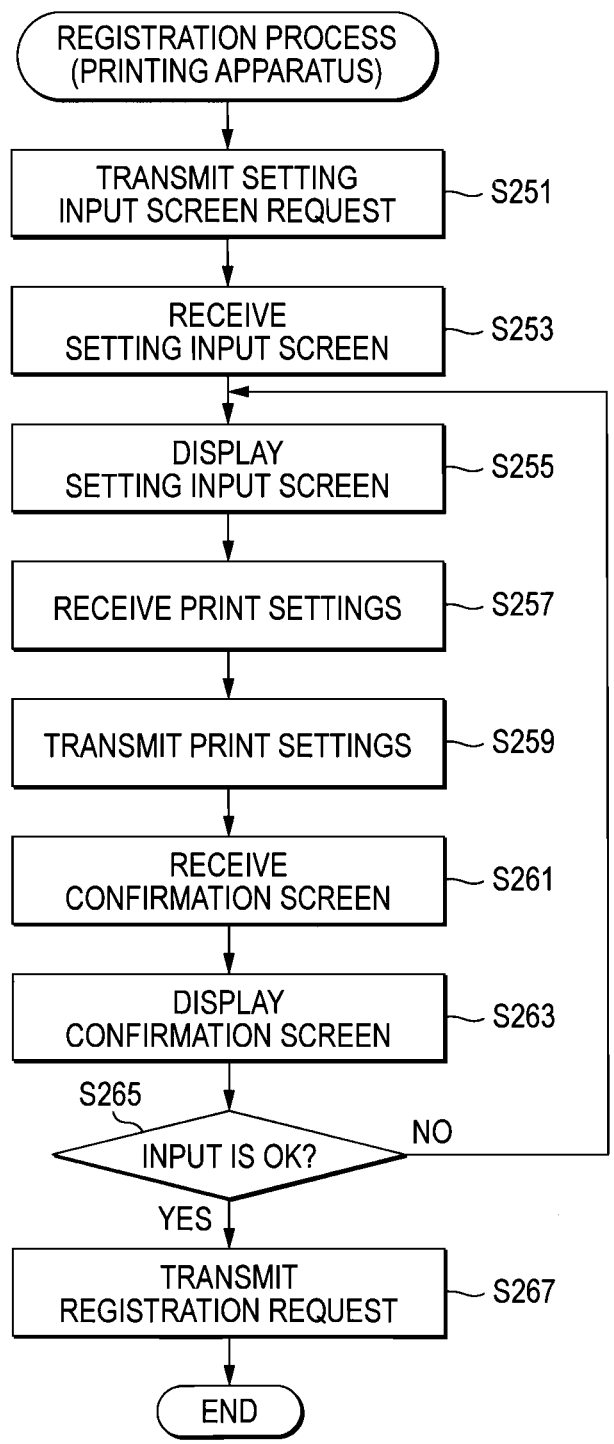
FIG. 17 is a flowchart illustrating a registration process (printing apparatus)

Next, the registration process (printing apparatus) performed in the control unit 31 of the printing apparatus 11 will be described with reference to FIG. 17. The registration process (printing apparatus) is performed in the printing apparatus 11 in order to newly register the print setting information in the communication apparatus 12. When the user uses the operation unit 38 to perform an operation of registering the print setting information, the registration process (printing apparatus) starts and is then performed.

A request packet for requesting the setting input screen is transmitted to the communication apparatus 12 (S251). The setting input screen is the same as the setting input screen (see FIG. 23) which is received from the communication apparatus 12 in the second printing process (printing apparatus) (see FIG. 14). When the setting input screen is transmitted from the communication apparatus 12 after the request packet is transmitted (see S273 in FIG. 18), the setting input screen is received (S253). The received setting input screen is displayed on the display unit 36 (S255). In this state, the user can use the operation unit 38 to select and input a desired printing condition.

When the user selects and inputs the printing conditions forming the print setting information, each of the input printing conditions is received (S257). The print setting information including the received printing conditions and the model name of the printing apparatus 11 are transmitted to the communication apparatus 12 (S259). After the print setting information is transmitted, the confirmation screen (see S277 in FIG. 18) transmitted from the communication apparatus 12 is received (S261). The confirmation screen is for presenting the printing conditions forming the print setting information received in Step S257 to the user and prompting the user to check whether there is a problem in the content of the input print setting information. The received confirmation screen is displayed on the display unit 36 (S263).

The user checks the content of the input print setting information and determines whether there is a problem in the input content. The user uses the operation unit 38 to input the determination result. When there is a problem in the content of the print setting information displayed on the confirmation screen (S265: NO), the process returns to Step S255 in order to allow the user to input the print setting information again. On the other hand, when there is no problem in the content of the print setting information displayed on the confirmation screen (S265: YES), it is determined that the print setting information is input normally. A request packet for requesting the registration of the print setting information transmitted in Step S259 is transmitted to the communication apparatus 12 (S267). The registration process (printing apparatus) ends.

Figure 18:
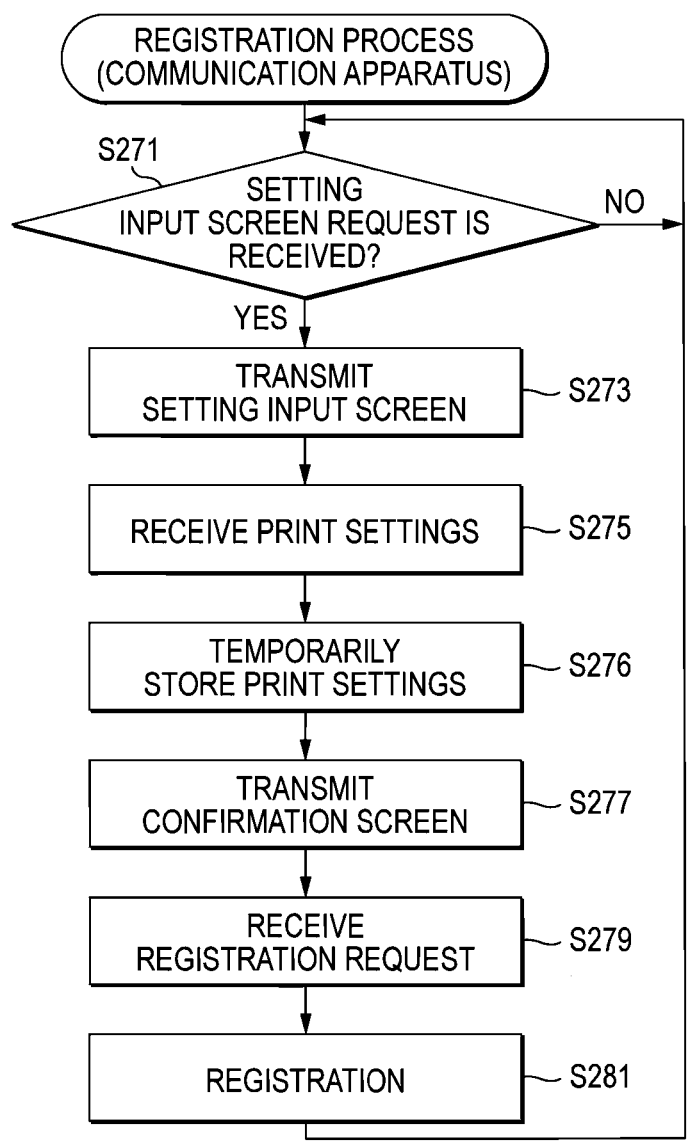
FIG. 18 is a flowchart illustrating the registration process (communication apparatus)

Next, the registration process (communication apparatus) performed in the control unit 21 of the communication apparatus 12 will be described with reference to FIG. 18. The registration process (communication apparatus) is performed in the communication apparatus 12 in order to register the print setting information in the second table 322 (see FIG. 4) in response to the request from the printing apparatus 11. When the control unit 21 is turned on, the registration process (communication apparatus) starts and is then performed.

The reception of a request packet (see S251 in FIG. 17) for requesting the transmission of the setting input screen from the printing apparatus 11 is monitored (S271). When the request packet is not received (S271: NO), the process returns to Step S271. When the request packet is received (S271: YES), the setting input screen is transmitted to the printing apparatus 11 (S273). After the setting input screen is transmitted, the print setting information (see S259 in FIG. 17) and the model name transmitted from the printing apparatus 11 are received (S275). The received print setting information and model name are temporarily stored in the RAM (S276). A confirmation screen for presenting the printing conditions forming the received print setting information to the user is created. The created confirmation screen is transmitted to the printing apparatus 11 (S277).

After the confirmation screen is transmitted, the request packet (see S267 in FIG. 17) which is transmitted from the printing apparatus 11 and requests the registration of the print setting information is received (S279). When the request packet is received, the print setting information and the model name which are temporarily stored in the RAM in Step S276 are stored in the second table 322 (see FIG. 4). The service information stored in the RAM is associated with the stored print setting information. The name of the print setting information is stored. In this way, the print setting information is registered in the communication apparatus 12 (S281). The process returns to Step S271.

Figure 19:
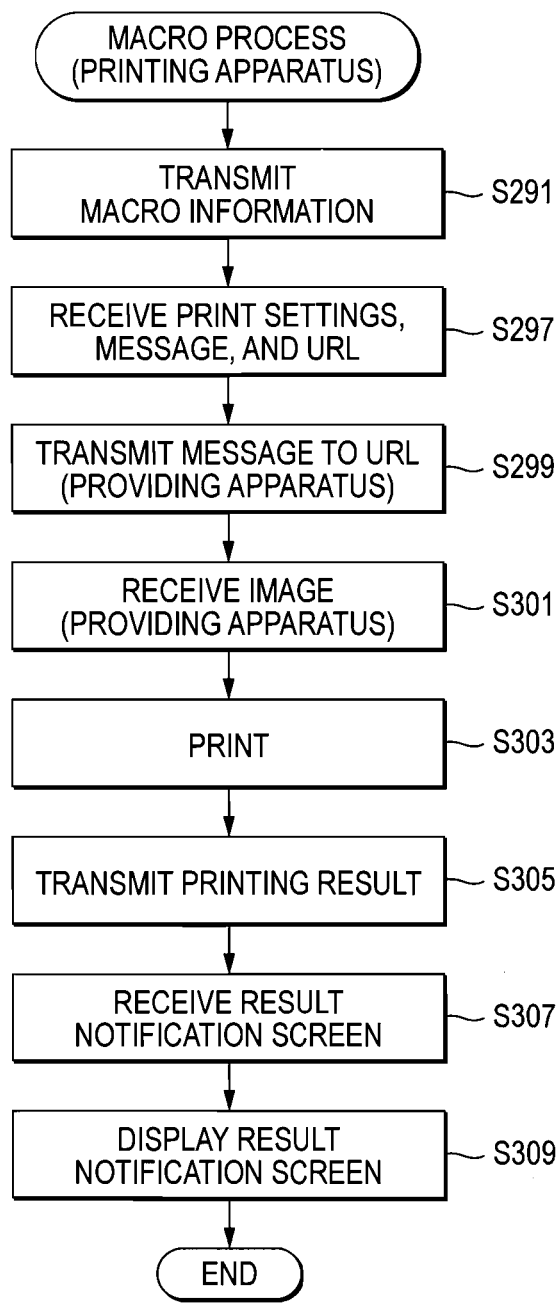
FIG. 19 is a flowchart illustrating a macro process (printing apparatus)

Next, the macro process (printing apparatus) performed in the control unit 31 of the printing apparatus 11 will be described with reference to FIG. 19. In the macro process (printing apparatus), the printing apparatus 11 can acquire a macro from the communication apparatus 12. The macro is an executable file by which predetermined processes are sequentially performed. The acquired macro is executed to use the services provided by the providing apparatus 13 (acquire images), acquire the print setting information, and perform each process in printing. When the user uses the operation unit 38 to select and input the type of macro, the macro process (printing apparatus) starts and is then performed.

The user selects and inputs a desired macro from a plurality of macros with different conditions, such as different types of images to be printed, different numbers of images, and different selecting methods. Information (hereinafter, referred to as "macro information") indicating the type of input macro is transmitted to the communication apparatus 12 (S291). When the macro is transmitted from the communication apparatus 12 after the macro information is transmitted (see S407 in FIG. 20), the macro is received. The received macro includes print setting information, an HTTP message, and an image URL (S297).

The macro is executed. When the macro is executed, the following processes are sequentially performed. First, the HTTP message included in the macro is transmitted to the image URL of the providing apparatus 13 (S299). Then, the image transmitted from the providing apparatus 13 in response to the HTTP message is received (S301). Then, the received image is printed on the basis of the print setting information included in the macro (S303). The above process is performed by the execution of the macro received in Step S297.

The printing result indicating whether the printing of the image ends normally is transmitted to the communication apparatus 12 (S305). After the printing result is transmitted, the result notification screen (see S411 in FIG. 20) transmitted from the communication apparatus 12 is received (S307). The received result notification screen is displayed on the display unit 36 (S309). The macro process ends. As described above, the printing apparatus 11 executes the macro acquired from the communication apparatus 12 to rapidly acquire the image and the print setting information and print the image in a short time.

Figure 20:
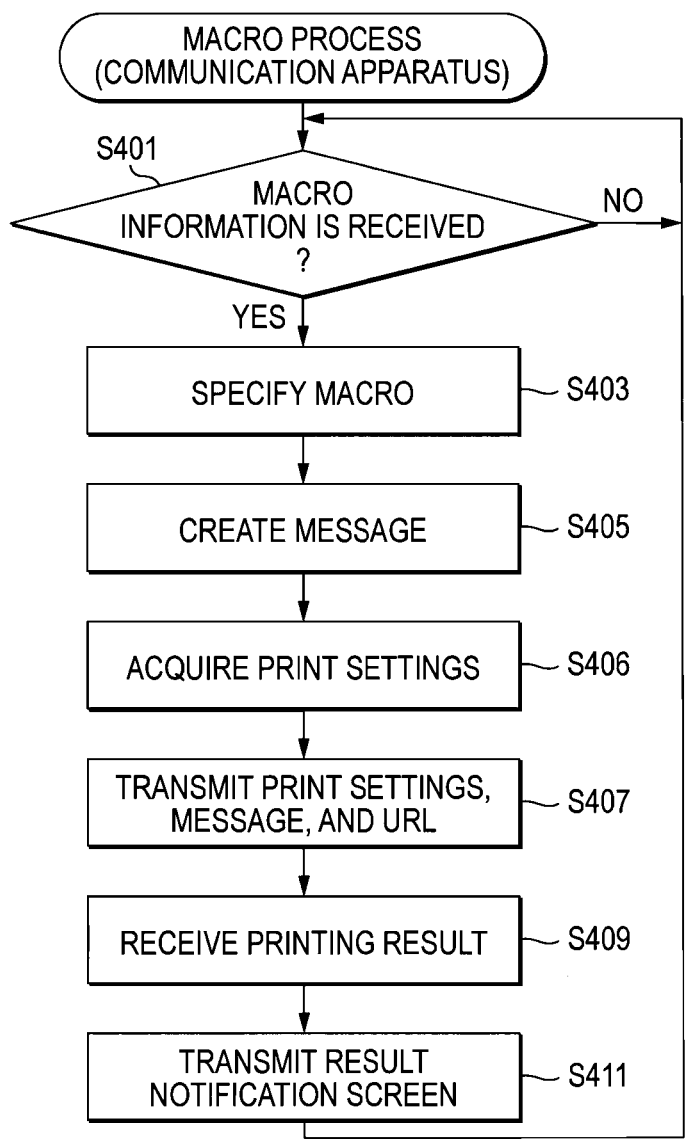
FIG. 20 is a flowchart illustrating the macro process (communication apparatus)

Next, the macro process (communication apparatus) performed in the control unit 21 of the communication apparatus 12 will be described with reference to FIG. 20. In the macro process (communication apparatus), a macro is created in response to the request from the printing apparatus 11 and is then transmitted to the printing apparatus 11. When the control unit 21 is turned on, the macro process (communication apparatus) starts and is then performed.

The reception of macro information (see S291 in FIG. 19) from the printing apparatus 11 is monitored (S401). When the macro information is not received (S401: NO), the process returns to Step S401. When the macro information is received (S401: YES), the type of macro specified by the received macro information is specified (S403). The conditions of the specified macro are specified and a macro satisfying the specified conditions is created as follows.

The service information stored in the RAM is read. An HTTP message for requesting an image URL is transmitted to the providing apparatus 13 that provides the read service. The image URL transmitted from the providing apparatus 13 in response to the HTTP message is received. An HTTP message required to request an image from the received image URL is created (S405). In addition, the print setting information corresponding to the read service is acquired with reference to the second table 322 (see FIG. 4). When there is a plurality of print setting information items, any one of the print setting information items is acquired (S406). A macro including the acquired print setting information, the created HTTP message, and the image URL acquired from the providing apparatus 13 is created and transmitted to the printing apparatus 11 (S407).

When the printing result is transmitted from the printing apparatus 11 after the macro is transmitted (see S305 in FIG. 19), the printing result is received (S409). A result notification screen for notifying the user whether printing ends normally in the printing apparatus 11 is created on the basis of the received printing result. The created result notification screen is transmitted to the printing apparatus 11 (S411). The process returns to Step S401. As described above, the communication apparatus 12 can create the macro including the print setting information, the image URL, and the HTTP message and transmit the macro to the printing apparatus 11.

As described above, the printing apparatus 11 can acquire the print setting information most suitable for the services which are provided by the providing apparatus 13 from the communication apparatus 12. The printing apparatus 11 can print the image which is acquired using the service provided by the providing apparatus 13, on the basis of the print setting information acquired from the communication apparatus 12. Therefore, the user can print the image on the basis of the optimal print setting information, without setting the print setting information to the printing apparatus 11 during printing. In addition, even when the user selects different services, the printing apparatus 11 can acquire the print setting information most suitable for each service from the communication apparatus 12 and print images. The printing apparatus 11 acquires the print setting information from the communication apparatus 12 through the network 2. Therefore, even when the user uses any of the printing apparatuses 11 connected to the network, it is possible to simply perform printing on the basis of the optimal print setting information all the time.

The control unit 31 performing Step S11 corresponds to "first acquiring unit" according to the invention. The control unit 31 performing Step S13 corresponds to "first transmitting unit" according to the invention. The control unit 31 performing Step S147 corresponds to "first receiving unit" according to the invention. The control unit 31 performing Step S73 corresponds to "second transmitting unit" according to the invention. The control unit 31 performing Step S75 corresponds to "second receiving unit" according to the invention. The control unit 31 performing Step S149 corresponds to "first printing unit" according to the invention. The control unit 21 performing Step S41 corresponds to "third receiving unit" according to the invention. The control unit 21 performing Step S168 corresponds to "second acquiring unit" according to the invention. The control unit 21 performing Step S171 corresponds to "third transmitting unit" according to the invention. The storage unit 22 corresponds to "storage unit" according to the invention. The control unit 31 performing Step S25 corresponds to "fourth transmitting unit" according to the invention. The control unit 21 performing Step S49 corresponds to "fourth receiving unit" according to the invention. The control unit 21 performing Steps S405 and S406 corresponds to "third acquiring unit" according to the invention. The control unit 21 performing Step S407 corresponds to "fifth transmitting unit" according to the invention. The control unit 31 performing Step S297 corresponds to "fifth receiving unit" according to the invention. The control unit 31 performing Steps S299, S301, and S303 corresponds to "collective execution unit" according to the invention. The control unit 31 performing Step S145 corresponds to "sixth transmitting unit" according to the invention. The control unit 21 performing Step S167 corresponds to "sixth receiving unit" according to the invention. The control unit 21 performing Step S169 corresponds to "conversion unit" according to the invention. The control unit 21 performing Step S168 corresponds to "fourth acquiring unit" according to the invention. The control unit 21 performing Step S171 corresponds to "seventh transmitting unit" according to the invention. The control unit 31 performing Step S147 corresponds to "seventh receiving unit" according to the invention. The control unit 31 performing Step S113 corresponds to "determining unit" according to the invention. The control unit 31 performing Step S185 corresponds to "first accepting unit" and "second accepting unit" according to the invention. The control unit 31 performing Step S187 corresponds to "eighth transmitting unit" and "ninth transmitting unit" according to the invention. The control unit 21 performing Step 223 corresponds to "eighth receiving unit" and "ninth receiving unit" according to the invention. The control unit 21 performing Step S239 corresponds to "first storage control unit" and "second storage control unit" according to the invention. Step S11 corresponds to a "first acquiring step" according to the invention. Step S13 corresponds to a "first transmitting step" according to the invention. Step S147 corresponds to a "first receiving step" according to the invention. Step S73 corresponds to a "second transmitting step" according to the invention. Step S75 corresponds to a "second receiving step" according to the invention. Step S149 corresponds to a "first printing step"

according to the invention. Step S41 corresponds to a "third receiving step" according to the invention. Step S168 corresponds to a "second acquiring step" according to the invention. Step S171 corresponds to a "third transmitting step" according to the invention.

The invention is not limited to the above-described embodiment, but various modifications of the invention can be made. In the communication apparatus 12 according to the above-described embodiment, the print setting information corresponding to the service which is input by the user during a log-in operation is specified with reference to the second table 322 (see FIG. 4). For example, the communication apparatus 12 may specify the print setting information corresponding to the logged-in user. This will be described below.

FIG. 24 shows a second table 324, which is another example of the second table stored in the storage unit 22 of the communication apparatus 12. The second table 324 stores a user ID and the number of uses, in addition to the printing conditions stored in the second table 322 shown in FIG. 4. The communication apparatus 12 can specify the print setting information corresponding to the ID of the logged-in user with reference to the second table 324.

When the second table 324 is used to specify the print setting information, the service information and the ID which are stored in the RAM in the log-in process (communication apparatus) (see FIG. 7) are read in the first printing process (communication apparatus). Each of the information and the ID is based on the information received from the printing apparatus 11 (see S13 and S25 in FIG. 6). In Step S161, the print setting information items associated with the services and the IDs stored in the RAM are extracted with reference to the second table 324 (see FIG. 24). A setting selection screen capable of selecting any one of the extracted print setting information items is created. The created setting selection screen is transmitted to the printing apparatus 11 (S161). The user of the printing apparatus 11 can select the print setting information corresponding to the service and the ID from the print setting information items registered in the communication apparatus 12. The printing apparatus 11 can acquire the print setting information most suitable for each user from the communication apparatus (see S168). Therefore, the printing apparatus can print images under the printing conditions that each user wants.

In the above-described embodiment, the print setting information associated with a plurality of IDs including at least the IDs stored in the RAM may be extracted from the second table 324. In this case, the user can select desired print setting information with reference to the print setting information which is registered by other persons in addition to the user's registered print setting information. Therefore, the user can select the optimal print setting information from the candidates of a plurality of print setting information items and use the selected print setting information as the print setting information used when images are printed.

The print setting information may be selected on the basis of the number of uses stored in the second table 324. The number of uses unit a counter value which is increased by 1 whenever the control unit 21 refers to the second table. The communication apparatus 12 may extract a predetermined number of print setting information items from a plurality of print setting information items in descending order of the number of uses and create a setting selection screen capable of selecting the print setting information items. Alternatively, the print setting information associated with the largest number of uses may be selected. The selected print setting information may be transmitted to the printing apparatus 11 as the print setting information when the printing apparatus 11 prints images.

What is claimed is:

1. A printing system comprising:
   a printing apparatus configured to print an image acquired from providing servers managed by image sharing service providers, each of which provides an image sharing service for storing images in a database and sharing the images, a format of the images provided by the image sharing service providers varying depending on the image sharing services;
   a communication apparatus communicable with the printing apparatus through the Internet; and
   a memory configured to store a first table in which plural pieces of image sharing service information and plural pieces of print setting information are associated with each other,
   wherein each of the plural pieces of image sharing service information specifies an image sharing service and each of the plural pieces of print setting information specifies print settings based on the format of the images provided by the associated image sharing service;
   wherein the printing apparatus includes:
     a first network connection communicable with the communication apparatus through the Internet; and
     a first controller configured to:
       acquire the image sharing service information for a particular image sharing service;
       transmit the acquired image sharing service information to the communication apparatus through the Internet;
       receive the print setting information associated with the particular image sharing service from the communication apparatus through the Internet after transmitting the image sharing service information;
       transmit a command to request the image to be printed to the providing server through the Internet;
       receive the image from the providing server through the Internet after transmitting the command; and
       print the received image on the basis of the received print setting information, and
   wherein the communication apparatus includes:
     a second network connection communicable with the printing apparatus through the Internet;
     a second controller configured to:
       receive the image sharing service information transmitted from the printing apparatus through the Internet;
       acquire the print setting information associated with the particular image sharing service in the first table stored in the memory; and
       transmit the acquired print setting information to the printing apparatus.

2. The printing system according to claim 1,
   wherein the memory stores user identification information for identifying a user, the image sharing service information, and the print setting information so as to be associated with each other,
   wherein the first controller of the printing apparatus is further configured to transmit the user identification information to the communication apparatus through the Internet, wherein the second controller of the communication apparatus is further configured to receive the user identification information transmitted from the printing apparatus through the Internet, and wherein the second controller is configured to acquire the print setting information corresponding to the received image sharing service information and the received user identification information with reference to the memory.

3. The printing system according to claim 1, wherein the print setting information includes a first print setting information item which is determined for each image sharing service and a second common print setting information item which does not depend on the image sharing service.

4. The printing system according to claim 1, wherein the second controller of the communication apparatus is further configured to:
acquire the command and the print setting information; and
transmit, to the printing apparatus through the Internet, data that includes the command and the acquired print setting information and instruct the printing apparatus to collectively perform the reception of the image from the providing server and the printing of the image on the basis of the print setting information, and the first controller of the printing apparatus is further configured to:
receive the data transmitted from the communication apparatus through the Internet; and
collectively perform the reception of the image from the providing server through the Internet and the printing of the image on the basis of the print setting information in response to instruction by the received data, wherein the first controller is configured to transmit the command included in the data to the providing server through the Internet, receive the image from the providing server after transmitting the command, and print the image received from the providing server on the basis of the print setting information included in the data.

5. The printing system according to claim 1, wherein the first controller of the printing apparatus is further configured to transmit apparatus type information for specifying the type of the printing apparatus to the communication apparatus through the Internet, the second controller of the communication apparatus is further configured to:
receive the apparatus type information transmitted from the printing apparatus through the Internet; and
convert the acquired print setting information into print setting information which is applicable to the printing apparatus specified by the received apparatus type information, and
transmit the converted print setting information to the printing apparatus when the print setting information is converted.

6. The printing system according to claim 2, wherein the second controller of the communication apparatus is further configured to:
acquire a plurality of print setting information items corresponding to a plurality of user identification information items including at least the user identification information with reference to the memory; and
transmit the plurality of acquired print setting information items to the printing apparatus through the Internet, the first controller of the printing apparatus is further configured to receive the plurality of print setting information items, and wherein the first controller prints the image on the basis of the print setting information selected by the user among the plurality of received print setting information items.

7. The printing system according to claim 1, wherein the first controller of the printing apparatus is further configured to:
determine whether the print setting information is stored in the memory of the communication apparatus;
accept the print setting information which is directly input by the user when it is determined that the print setting information is not stored in the memory; and
transmit the accepted print setting information to the communication apparatus through the Internet, and the second controller of the communication apparatus is further configured to:
receive the print setting information from the printing apparatus; and
store the received print setting information in the memory when the print setting information is received.

8. The printing system according to claim 1, wherein the first controller of the printing apparatus is further configured to:
accept the print setting information which is directly input by the user when the image is printed; and
transmit the accepted print setting information to the communication apparatus through the Internet, and the second controller of the communication apparatus is further configured to:
receive the print setting information from the printing apparatus; and
store the received print setting information in the memory when the print setting information is received.

9. A printing apparatus configured to print an image acquired from providing servers managed by image sharing service providers, each of which provides an image sharing service for storing images in a database and sharing the images, a format of the images provided by the image sharing service providers varying depending on the image sharing services, the printing apparatus comprising:
a first network connection communicable with a communication apparatus through the Internet, the communication apparatus being configured to access print setting information from a table stored in a memory in which plural pieces of image sharing service information and plural pieces of print setting information are associated with each other; and
a first controller configured to:
acquire image sharing service information specifying a particular image sharing service;
transmit the acquired image sharing service information to the communication apparatus through the Internet;
receive from the communication apparatus print setting information associated with the particular image sharing service in the table after transmitting the image sharing service information for the particular image sharing service, each of the plural pieces of image sharing service information in the table specifying an image sharing service and each of the plural pieces of print setting information in the table specifying print settings based on the format of the images provided by the associated image sharing service;

transmit a command to request the image to be printed to the providing server through the Internet;

receive the image from the providing server after transmitting the command; and print the received image on the basis of the received print setting information.

10. A non-transitory computer readable medium storing a printing program for, when executed by a processor, causing a printing apparatus, which prints an image acquired from providing servers managed by image sharing service providers, each of which provides an image sharing service for storing images in a database and sharing the images, a format of the images provided by the image sharing service providers varying depending on the image sharing services, to:

acquire image sharing service information specifying a particular image sharing service;

transmit the acquired image sharing service information to a communication apparatus through the Internet, the communication apparatus being configured to access print setting information from a table stored in a memory in which plural pieces of image sharing service information and plural pieces of print setting information are associated with each other;

receive from the communication apparatus print setting information associated with the particular image sharing service in the table after the transmitting of the image sharing service information for the particular image sharing service, each of the plural pieces of image sharing service information in the table specifying an image sharing service and each of the plural pieces of print setting information in the table specifying print settings based on the format of the images provided by the associated image sharing service;

transmit a command to request the image to be printed to the providing server through the Internet;

receive the image from the providing server after the transmitting of the command; and print the received image on the basis of the received print setting information.

11. The printing system according to claim 1, wherein the communication apparatus includes the memory.

12. The printing system according to claim 1, wherein in the first table, model names of printing apparatuses is further associated with the plural pieces of image sharing service information and the plural pieces of print setting information, the memory includes a second table in which the model names of the printing apparatus and each item of the printing setting information are associated with each other, the second controller receives the model name of the printing apparatus from the printing apparatus, if the model name of the printing apparatus received from the printing apparatus is different from the model named of the printing apparatus associated with the acquired print setting information, the second controller converts the acquired print setting information with reference to the second table, and the second controller transmits the converted print setting information to the printing apparatus.

* * * * *